US007853075B2

(12) United States Patent
Mattausch et al.

(10) Patent No.: US 7,853,075 B2
(45) Date of Patent: Dec. 14, 2010

(54) IMAGE SEGMENTATION APPARATUS AND IMAGE SEGMENTATION METHOD

(75) Inventors: Hans Juergen Mattausch, Hiroshima (JP); Tetsushi Koide, Hiroshima (JP); Kosuke Yamaoka, Hiroshima (JP)

(73) Assignee: Hiroshima University, Higashihiroshima-shi, Hiroshima (JP)

( * ) Notice: Subject to any disclaimer, the term of this patent is extended or adjusted under 35 U.S.C. 154(b) by 0 days.

(21) Appl. No.: 12/601,595

(22) PCT Filed: Jul. 31, 2008

(86) PCT No.: PCT/JP2008/002066

§ 371 (c)(1),
(2), (4) Date: Nov. 24, 2009

(87) PCT Pub. No.: WO2010/013291

PCT Pub. Date: Feb. 4, 2010

(65) Prior Publication Data

US 2010/0202684 A1 Aug. 12, 2010

(51) Int. Cl.
*G06K 9/00* (2006.01)
*G06K 9/34* (2006.01)
*H04N 1/00* (2006.01)
*H04N 1/46* (2006.01)

(52) U.S. Cl. ....................... 382/164; 382/171; 382/173; 358/453; 358/538

(58) Field of Classification Search ....................... None
See application file for complete search history.

(56) References Cited

U.S. PATENT DOCUMENTS 7,440,589 B2 * 10/2008 Garoutte ..................... 382/103

(Continued)

FOREIGN PATENT DOCUMENTS

JP 06-259549 9/1994

(Continued)

OTHER PUBLICATIONS

Angulo et al. "Color Segmentation by Ordered Mergins", 2003, IEEE, pp. 125-128.*

(Continued)

*Primary Examiner*—Anand Bhatnagar
*Assistant Examiner*—Randolph Chu
(74) *Attorney, Agent, or Firm*—Foley & Lardner LLP

(57) ABSTRACT

A pixel-value detecting circuit (1) detects RGB values of each pixel of an input image and outputs the detected RGB values to a connection weight determining circuit (2). When both of two adjacent pixels have achromatic color, the connection weight determining circuit (2) determines a first connection weight, which is a connection weight between the two pixels, by using only the RGB values. When one of the two pixels has achromatic color, the connection weight determining circuit (2) determines, as a connection weight, a second connection weight that is smaller than the first connection weight, by using the RGB values and saturations. When both of the two pixels have chromatic color, the connection weight determining circuit (2) determines, as a connection weight, a third connection weight that is greater than or equal to the first connection weight, by using the RGB values and hues. An image segmenting circuit (3) segments the input image into images of subjects by using the connection weight determined by the connection weight determining circuit (2).

17 Claims, 21 Drawing Sheets

U.S. PATENT DOCUMENTS

| | | | | |
|---|---|---|---|---|
| 2003/0219157 | A1 * | 11/2003 | Koide et al. | 382/173 |
| 2005/0100212 | A1 * | 5/2005 | Eguchi et al. | 382/164 |
| 2007/0160286 | A1 * | 7/2007 | Haque | 382/164 |

FOREIGN PATENT DOCUMENTS

| | | |
|---|---|---|
| JP | 11-096364 | 4/1999 |
| JP | 2003-346142 | 12/2003 |

OTHER PUBLICATIONS

Lucchese et al. "Colour segmentation based on separate anisotropoc diffusion of chromatic and achromatic channels", 2001 IEE Proceedings, pp. 141-150.*

Tico et al. "An Unupervised Method of Rough Color Image Segmentation", 1999, IEEE, pp. 58-62.*

International Search Report and Written Opinion for PCT/JP2008/002066 mailed Aug. 26, 2008.

Wang, D.L. et al., "Image Segmentation Based on Oscillatory Correlation," Neural Computation, vol. 9, pp. 1-30, 1997.

Jahne, B., "Digital Image Processing," Springer-Verlag, pp. 427-439, 2001.

Russ, J. C., "The Image Processing Handbook," CRC Press—IEEE Press, pp. 371-429, 1998.

Braunl, T. et al., "Parallel Image Processing," Springer-Verlag, pp. 59-63, 2000.

Ma, W. Y. et al., "EdgeFlow: A Technique for Boundary Detection Image Segmentation," IEEE Transactions on Image Processing, vol. 9, No. 8, pp. 1375-1388, Aug. 2000.

* cited by examiner

IMAGES CONTAINING LOW-CONTRAST REGIONS

IMAGES CONTAINING AMBIENT REFLECTION (a) SAMPLE IMAGE CONTAINING REFLECTION REGION (b) CHANGE BETWEEN CONTIGUOUS PIXELS IN REGION AFFECTED BY REFLECTION (BETWEEN A-B)

(c) CHANGE BETWEEN CONTIGUOUS PIXELS IN REGION UNAFFECTED BY REFLECTION (BETWEEN C-D)

IMAGE SEGMENTATION APPARATUS AND IMAGE SEGMENTATION METHOD

CROSS-REFERENCE TO RELATED APPLICATIONS

The present application is a U.S. national stage application claiming the benefit of International Application No. PCT/JP2008/002066, filed on Jul. 31, 2008, the entire content of which is incorporated herein by reference in its entirety.

TECHNICAL FIELD

The present invention relates to an image segmentation apparatus and an image segmentation method.

BACKGROUND ART

Conventionally, an image-region segmentation apparatus for segmenting an input image into achromatic regions and chromatic regions by using saturations and hue differences has been known (Japanese Unexamined Patent Application Publication No. 6-259549).

This image-region segmentation apparatus includes an image input section, a normalization processing section, a saturation detecting section, a hue-difference detecting section, a feature determining section and a digitization processing section. The image input section receives a color image, generates a target image that is subjected to region segmentation on the basis of the received image, and outputs an R image, a G image, and a B image showing R (red) components, G (green) components, and B (blue) components of the target image to the normalization processing section.

The normalization processing section receives the three R image, G image, and B image output from the image input section. With respect to individual pixels of the target image, the normalization processing section converts the R, G, and B components into X components and Y components normalized according to brightness. The normalization processing section then generates an X image, in which pixel values of the target image are the X components, and a Y image, in which pixel values of the target image are the y components, and outputs the generated X image and Y image to the saturation detecting section and the hue-difference detecting section.

The saturation detecting section receives the X image and Y image output from the normalization processing section, determines the saturations of the individual pixels of the target image on the basis of the X components and Y components, outputs, to the feature determining section, a saturation image in which the values of the pixel values of the target image are represented by the determined saturations. The saturation $S_k$ of the pixel $P_k$ (k=1, 2, . . . , N) of the target image is determined by $S_k=(x_k^2+y_k^2)^{1/2}$, where $x_k$ indicates the X component of $P_k$ and $y_k$ indicates the Y component.

The hue detecting section receives the X image and Y image output from the normalization processing section, determines the hues of the individual pixels of the target image on the basis of the X components and the Y components, and determines a hue difference between the hues and a hue $\theta_c$ of a chromatic region. The hue detecting section then outputs, to the feature determining section, a hue-difference image in which the value of each pixel value of the target image is represented by the determined hue difference. A hue $\theta_k$ of the target image $P_k$ is determined by $\theta_k=\tan^{-1}(y_k/x_k)$.

Upon receiving the saturation image from the saturation detecting section and receiving the hue-difference image from the hue detecting section, the feature determining section determines features from the saturation and hue difference of each pixel. For example, the feature determining section determines features $F_k$ of the pixel $P_k$ of the target image by using $F_k=S_k\cos(\theta_k-\theta_c)$. The feature determining section then outputs, to the digitization processing section, a feature image in which the value of each pixel of the target image is represented by the determined features $F_k$.

Upon receiving the feature image from the feature determining section, the digitization processing section digitizes the feature image. Of the two regions segmented by the digitization, the digitization processing section outputs a region having smaller features as an achromatic region and outputs a region having larger features as a chromatic region.

As described above, the conventional image-region segmentation apparatus uses the saturation at each point in an input image and a hue difference between the hue at each point in the input image and the hue of a chromatic region, to determine features for segmenting the input image into achromatic regions and chromatic regions, and uses the determined features to segment the input image into achromatic regions and chromatic regions.

DISCLOSURE OF INVENTION

However, since the conventional image-region segmentation apparatus segments an image by using the saturation of each pixel of an input image and the hue difference between the hue of each pixel and the hue of a chromatic region, there is a problem in that it is difficult to accurately segment an input image into images of subjects, when a subject to be subjected to segmentation has achromatic color.

Accordingly, it is desirable to provide an image segmentation apparatus that is capable of accurately segmenting an input image containing a color image into images of subjects.

It is also desirable to provide an image segmentation method that is capable of accurately segmenting an input image containing a color image into images of subjects.

An image segmentation apparatus includes a connection weight determining circuit and an image determining device. The connection weight determining circuit executes, with respect to between pixels of one frame, connection weight determination processing in which when both of two pixels have achromatic color, a first connection weight that is a connection weight between the two pixels is determined by using RGB values of the two pixels, when one of the two pixels has achromatic color, a second connection weight that is smaller than the first connection weight is determined as a connection weight between the two pixels, and when both of the two pixels have chromatic color, a third connection weight that is greater than or equal to the first connection weight is determined as a connection weight between the two pixels. The image segmenting circuit segments the one frame into images of subjects on the basis of the first to third connection weights determined by the connection weight determining circuit.

The connection weight determining circuit may compute first and second saturations of the two pixels on the basis of the RGB values of the two pixels, may compare the computed first and second saturations with a threshold indicating a boundary between achromatic color and chromatic color to determine which of the achromatic color and the chromatic color the two pixels have, and the connection weight determining circuit may determine any of the first to third connection weights as a connection weight between the two pixels on the basis of a result of the determination.

By using an adder and a shifter, the connection weight determining circuit may compute the first and second saturations of the two pixels on the basis of the RGB values of the two pixels.

When both of the computed first and second saturations are smaller than or equal to the threshold, the connection weight determining circuit may determine that both of the two pixels have the achromatic color; when one of the first and second saturations is smaller than or equal to the threshold, the connection weight determining circuit may determine that one of the two pixels has the achromatic color and the other of the two pixels has the chromatic color; and when both of the first and second saturations are greater than the threshold, the connection weight determining circuit may determine that both of the two pixels have the chromatic color.

Upon determining that both of the two pixels have the achromatic color, the connection weight determining circuit may use only the RGB values of the two pixels to determine the first connection weight; upon determining that one of the two pixels has the achromatic color and the other of the two pixels has the chromatic color, the connection weight determining circuit may use the RGB values and the saturations of the two pixels to determine the second connection weight; and upon determining that both of the two pixels have the chromatic color, the connection weight determining circuit may use the RGB values and hues of the two pixels to determine the third connection weight.

The connection weight determining circuit may compute the first connection weight by using only the RGB values; upon determining that one of the two pixels has the achromatic color and the other of the two pixels has the chromatic color, the connection weight determining circuit may determine the second connection weight by reducing the computed first connection weight in accordance with a saturation difference that is a difference between the saturations of the two pixels; and upon determining that both of the two pixels have the chromatic color, the connection weight determining circuit may determine the third connection weight by increasing the first connection weight in accordance with a hue difference that is a difference between the hues of the two pixels.

Upon determining that both of the two pixels have the chromatic color, the connection weight determining circuit may compute first and second hues of the two pixels on the basis of the RGB values of the two pixels, may compute a difference between the computed first and second hues as the hue difference, and may determine the third connection weight by using the computed hue difference.

By using an adder and a shifter, the connection weight determining circuit may compute the first and second hues of the two pixels on the basis of the RGB values of the two pixels.

Upon determining that one of the two pixels has the achromatic color and the other of the two pixels has the chromatic color, the connection weight determining circuit may determine the second connection weight by making a reduction range from the first connection weight to be relatively small, when the saturation difference is relatively small, and may determine the third connection weight by making the reduction range from the first connection weight to be relatively large, when the saturation difference is relatively large.

The connection weight determining circuit may hold a table of association between a difference between the RGB values of the two pixels and a corrected connection weight reduced from the first connection weight in accordance with the saturation difference; and upon computing the saturation difference between the two pixels, the connection weight determining circuit may extract, from the association table, the corrected connection weight corresponding to the computed saturation difference and determine the extracted corrected connection weight as the second connection weight.

Upon determining that both of the two pixels have the chromatic color, the connection weight determining circuit may set a value that is greater than or equal to the first connection weight in accordance with the hue difference to determine the third connection weight when a difference between the RGB values of the two pixels shows that there is an influence of light reflection.

The connection weight determining circuit may determine the first connection weight as the third connection weight when the difference between the RGB values of the two pixels shows that there is no influence of light reflection.

The connection weight determining circuit may hold a table of association between a difference between the RGB values of the two pixels, the hue difference and a corrected connection weight increased from the first connection weight in accordance with the hue difference; and when the difference between the RGB values of the two pixels shows that there is an influence of light reflection and upon computing the hue difference between the two pixels, the connection weight determining circuit may extract, from the association table, the corrected connection weight corresponding to the computed hue difference and determine the extracted corrected connection weight as the third connection weight.

An image segmentation method comprises: a first step of receiving RGB values of two pixels; a second step of computing first and second hues of the two pixels on the basis of the received RGB values of the two pixels; a third step of computing first and second saturations of the two pixels on the basis of the received RGB values of the two pixels; a fourth step of determining whether or not both of the first and second saturations are smaller than or equal to a threshold indicating a boundary between achromatic color and chromatic color; a fifth step of determining a first connection weight, which is a connection weight between the two pixels, by using only the RGB values of the two pixels when it is determined in the fourth step that both of the first and second saturations are smaller than or equal to the threshold; a sixth step of determining, as a connection weight between the two pixels, a second connection weight that is smaller than the first connection weight, by using the RGB values of the two pixels and the first and second saturations when it is determined in the fourth step that one of the first and second saturations is smaller than or equal to the threshold; a seventh step of determining, as a connection weight between the two pixels, a third connection weight that is greater than or equal to the first connection weight, by using the RGB values of the two pixels and the first and second hues when it is determined in the fourth step that both of the first and second saturations are greater than the threshold; an eighth step of executing the first step to the seventh step with respect to between all pixels contained in one frame; and a ninth step of segmenting the one frame into images of subjects on the basis of the first to third connection weights determined by the execution of the eighth step.

The sixth step may include a first sub-step of computing the first connection weight by using only the RGB values and a second sub-step of determining the second connection weight by reducing the computed first connection weight in accordance with a saturation difference that is a difference between the saturations of the two pixels. The seven step may include: a third sub-step of computing the first connection weight by using only the RGB values; a fourth sub-step of determining, when the two pixels show that there is an influence of light reflection, the third connection weight by increasing the computed first connection weight in accordance with a hue difference that is a difference between the hues of the two pixels; and a fifth sub-step of determining the computed first connection weight as the third connection weight, when the two pixels show that there is no influence of light reflection.

In the second sub-step, when the saturation difference is relatively small, the second connection weight may be determined by making a reduction range from the first connection weight to be relatively small, and when the saturation difference is relatively large, the second connection weight may be determined by making the reduction range from the first connection weight to be relatively large.

Pixels affected by the light reflection may be pixels in which a difference between the RGB values of the two pixels exists between a first value and a second value that is greater than the first value.

When both of two pixels have achromatic color, a connection weight between the two pixels is determined to be a first connection weight by using the RGB values of the two pixels; when one of the two pixels has achromatic color, a connection weight between the two pixels is determined to be a second connection weight that is smaller than the first connection weight; and when both of the two pixels have chromatic color, a connection weight between the two pixels is determined to be a third connection weight that is greater than or equal to the first connection weight. Then, on the basis of the determined connection weight, image segmentation is performed. As a result, in an image in which the connection weight is the second connection weight, region growth is suppressed in image segmentation, and in an image in which the connection weight is the third connection weight, the region growth is prompted in the image segmentation. Then, in the image segmentation, a region having a saturation difference is discriminated and extracted, and a region having an identical hue is extracted as an identical region.

Accordingly, it is possible to accurately segment an input image containing a color image into images of subjects.

BEST MODE FOR CARRYING OUT THE INVENTION

Figure 1:
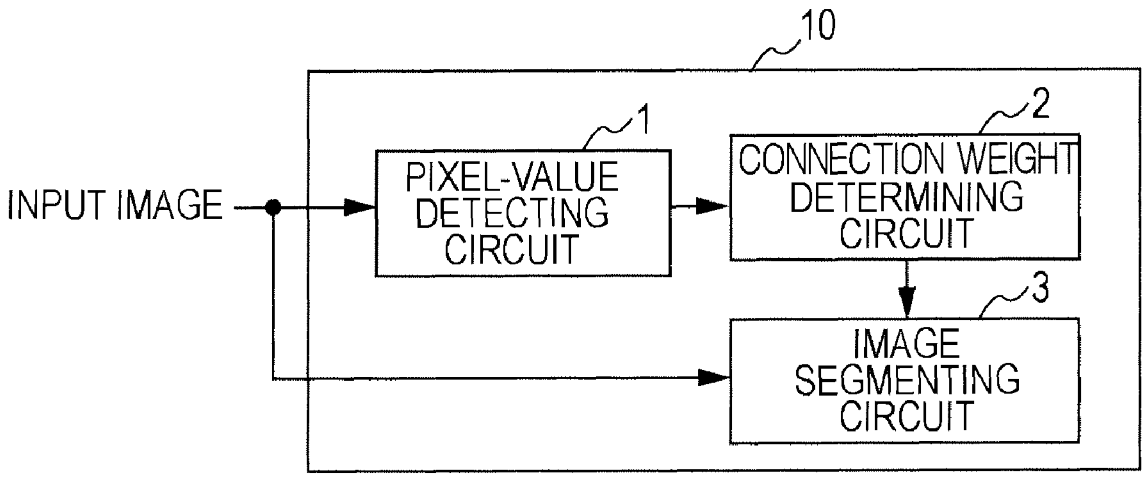
FIG. 1 is a schematic block diagram showing the configuration of an image segmentation apparatus according to an embodiment of the present invention.

An embodiment of the present invention will be described in detail with reference to the drawings. In the drawings, the same or corresponding sections are denoted by the same reference numerals and descriptions thereof are not repeated.

FIG. 1 is a schematic block diagram showing the configuration of an image segmentation apparatus according to an embodiment of the present invention. Referring to FIG. 1, an image segmentation apparatus 10 according to the embodiment of the present invention comprises a pixel-value detecting circuit 1, a connection weight determining circuit 2, and an image segmenting circuit 3.

The pixel-value detecting circuit 1 receives an input image for one frame, detects an R component, a G component, and a B component of each pixel of the received input image, and outputs the detected R component, G component, and B component to the connection weight determining circuit 2 as RGB values.

The connection weight determining circuit 2 receives the RGB values from the pixel-value detecting circuit 1. On the basis of the received RGB values, the connection weight determining circuit 2 determines connection weights between pixels of a plurality of pixels constituting a single frame by a method described below, and outputs the determined connection weights to the image segmenting circuit 3.

The image segmenting circuit 3 externally receives the input image and receives the connection weights from the connection weight determining circuit 2. Then, using the received connection weights, the image segmenting circuit 3 segments the input image, constituted by the one frame, into images of subjects by using a region-growing image segmentation method. The region-growing image segmentation method is a method for segmenting an image by repeating processing for determining a leader cell from, for example, 3×3 pixels and growing a region from the determined leader cell to regions in the surrounding pixels having relatively large connection weights, until no more leader cell exists.

Figure 2:
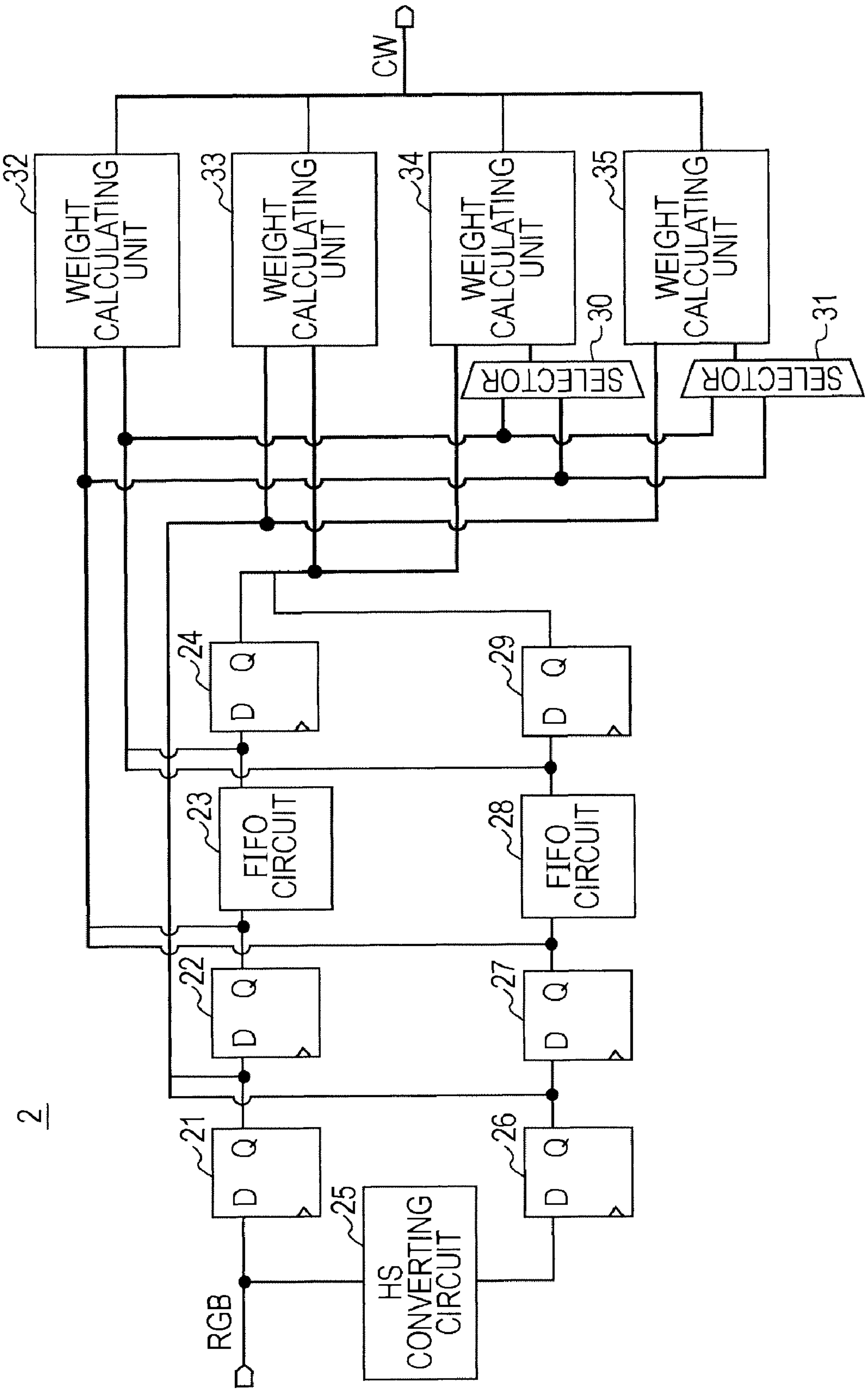
FIG. 2 is a schematic diagram showing the configuration of a connection weight determining circuit shown in FIG. 1.

FIG. 2 is a schematic diagram showing the configuration of the connection weight determining circuit 2 shown in FIG. 1. Referring to FIG. 2, the connection weight determining circuit 2 includes D latch circuits 21, 22, 24, 26, 27, and 29, FIFO circuits 23 and 28, an HS converting circuit 25, selectors 30 and 31, and weight calculating units 32 to 35.

The D latch circuit 21 receives the RGB values from the pixel-value detecting circuit 1, latches the received RGB values, and outputs the latched RGB values to the D latch circuit 22 and the weight calculating units 33 and 35.

The D latch circuit 22 receives the RGB values from the D latch circuit 21, latches the received RGB values, and outputs the latched RGB values to the FIFO circuit 23, the weight calculating unit 32, and the selectors 30 and 31.

The FIFO circuit 23 receives the RGB values from the D latch circuit 22, holds the received RGB values for an amount of time corresponding to one clock, and then outputs the RGB values to the D latch circuit 24, the weight calculating unit 32, and the selectors 30 and 31.

The D latch circuit 24 latches the RGB values received from the FIFO circuit 23 and outputs the latched RGB values to the weight calculating units 33 and 34.

The HS converting circuit 25 receives the RGB values from the pixel-value detecting circuit 1 and converts the received RGB values into a hue and a saturation by using a method described below. The HS converting circuit 25 then outputs the converted hue and saturation to the D latch circuit 26.

The D latch circuit 26 receives the hue and saturation from the HS converting circuit 25, latches the received hue and saturation, and outputs the latched hue and saturation to the D latch circuit 27 and the weight calculating units 33 and 35.

The D latch circuit 27 receives the hue and saturation from the D latch circuit 26, latches the received hue and saturation, and outputs the latched hue and saturation to the FIFO circuit 28, the weight calculating unit 32, and the selectors 30 and 31.

The FIFO circuit 28 receives the hue and saturation from the D latch circuit 27, holds the received hue and saturation for an amount of time corresponding to one clock, and then outputs the hue and saturation to the D latch circuit 29, the weight calculating unit 32, and the selectors 30 and 31.

The D latch circuit 29 receives the hue and saturation from the FIFO circuit 28, latches the received hue and saturation, and outputs the latched hue and saturation to the weight calculating units 33 and 34.

The selector 30 receives the RGB values from the D latch circuit 22 and the FIFO circuit 23 and the hues and saturations from the D latch circuit 27 and the FIFO circuit 28. The selector 30 then selects the RGB values received from the FIFO circuit 23 and the hue and saturation received from the FIFO circuit 28, and outputs the selected RGB values and the hue-and-saturation to the weight calculating unit 34.

The selector 31 receives the RGB values from the D latch circuit 22 and the FIFO circuit 23 and receives the hues and saturations from the D latch circuit 27 and the FIFO circuit 28. The selector 31 then selects the RGB values received from the D latch circuit 22 and the hue and saturation received from the D latch circuit 27, and outputs the selected RGB values and the hue-and-saturation to the weight calculating unit 35.

When the selector 30 selects the RGB values received from the D latch circuit 22 and the hue and saturation received from the D latch circuit 27 and outputs the selected RGB values and hue-and-saturation to the weight calculating unit 34, the selector 31 selects the RGB values received from the FIFO circuit 23 and the hue and saturation received from the FIFO circuit 28 and outputs the selected RGB values and hue-and-saturation to the weight calculating unit 35.

The weight calculating unit 32 receives the RGB values from the D latch circuit 22 and the FIFO circuit 23 and receives the hues and saturations from the D latch circuit 27 and the FIFO circuit 28. The weight calculating unit 32 then regards the RGB values received from the D latch circuit 22 and the hue and saturation received from the D latch circuit 27 as RGB values and hue-and-saturation (RGB3 and HS3) for one pixel GE3 and regards the RGB values received from the FIFO circuit 23 and the hue and saturation received from the FIFO circuit 28 as RGB values and hue-and-saturation (RGB2 and HS2) for another one pixel GE2. Thus, on the basis of the RGB values and the hue-and-saturation (RGB3 and HS3) and the RGB values and the hue-and-saturation (RGB2 and HS2), the weight calculating unit 32 computes a connection weight between the pixel GE2 and the pixel GE3 by using a method described below and outputs the computed connection weight to the image segmenting circuit 3.

The weight calculating unit 33 receives the RGB values from the D latch circuits 21 and 24 and receives the hues and saturations from the D latch circuits 26 and 29. The weight calculating unit 33 then regards the RGB values received from the D latch circuit 21 and the hue and saturation received from the D latch circuit 26 as RGB values and hue-and-saturation (RGB4 and HS4) for one pixel GE4 and regards the RGB values received from the D latch circuit 24 and the hue and saturation received from the D latch circuit 29 as RGB values and hue-and-saturation (RGB1 and HS1) for another one pixel GE1. Thus, on the basis of the RGB values and the hue-and-saturation (RGB4 and HS4) and the RGB values and the hue-and-saturation (RGB1 and HS1), the weight calculating unit 32 computes a connection weight between the pixel GE1 and the pixel GE4 by using a method described below and outputs the computed connection weight to the image segmenting circuit 3.

The weight calculating unit 34 receives the RGB values from the D latch circuit 24, receives the hue and saturation from the D latch circuits 29, and receives the RGB values and the hue-and-saturation from the selector 30. The weight calculating unit 34 then regards the RGB values received from the D latch circuit 24 and the hue and saturation received from the D latch circuit 29 as RGB values and hue-and-saturation (RGB1 and HS1) for one pixel GE1 and regards the RGB values and hue-and-saturation received from the selector 30 as RGB values and hue-and-saturation (RGB2 and HS2) for another one pixel GE2. Thus, on the basis of the RGB values and the hue-and-saturation (RGB1 and HS1) and the RGB values and the hue-and-saturation (RGB2 and HS2), the weight calculating unit 32 computes a connection weight between the pixel GE1 and the pixel GE2 by using a method described below and outputs the computed connection weight to the image segmenting circuit 3.

The weight calculating unit 35 receives the RGB values from the D latch circuit 21, receives the hue and saturation from the D latch circuits 26, and receives the RGB values and the hue-and-saturation from the selector 31. The weight calculating unit 35 then regards the RGB values received from the D latch circuit 21 and the hue and saturation received from the D latch circuit 26 as RGB values and hue-and-saturation (RGB4 and HS4) for one pixel GE4 and regards the RGB values and hue-and-saturation received from the selector 31 as RGB values and hue-and-saturation (RGB3 and HS3) for another one pixel GE3. Thus, on the basis of the RGB values and the hue-and-saturation (RGB4 and HS4) and the RGB values and the hue-and-saturation (RGB3 and HS3), the weight calculating unit 35 computes a connection weight between the pixel GE3 and the pixel GE4 by using a method described below and outputs the computed connection weight to the image segmenting circuit 3.

Figure 3:
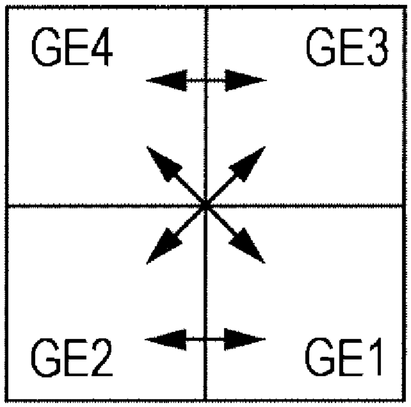
FIG. 3 is a conceptual diagram when the connection weight determining circuit shown in FIG. 2 determines connection weights.
Figure 4:
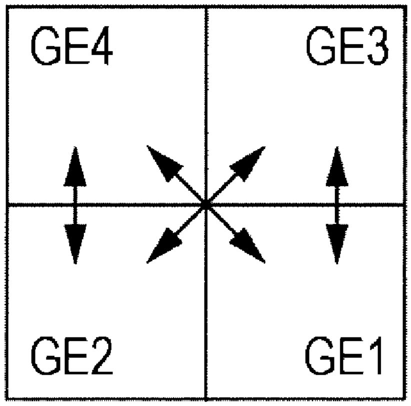
FIG. 4 is an another conceptual diagram when the connection weight determining circuit shown in FIG. 2 determines connection weights.

FIG. 3 is a conceptual diagram when the connection weight determining circuit 2 shown in FIG. 2 determines connection weights. FIG. 4 is an another conceptual diagram when the connection weight determining circuit 2 shown in FIG. 2 determines connection weights.

The connection weight determining circuit 2 determines connection weights for the pixels GE1 to GE4, arranged in two rows and two columns, in one cycle. If the RGB values RGB1 to RGB4 for the pixels GE1 to GE4 are sequentially input to the connection weight determining circuit 2, the weight calculating unit 32 receives the RGB values RGB2 of the pixel GE2 from the FIFO circuit 23, receives the hue-and-saturation HS2 of the pixel GE2 from the FIFO circuit 28, receives the RGB values RGB3 of the pixel GE3 from the D latch circuit 22, and the hue-and-saturation HS3 of the pixel GE3 from the D latch circuit 27.

The weight calculating unit 33 also receives the RGB values RGB1 of the pixel GE1 from the D latch circuit 24, receives the hue-and-saturation HS1 of the pixel GE1 from the D latch circuit 29, receives the RGB values RGB4 of the pixel GE4 from the D latch circuit 21, and receives the hue-and-saturation HS4 of the pixel GE4 from the D latch circuit 26.

In addition, the weight calculating unit 34 receives the RGB values RGB1 of the pixel GE1 from the D latch circuit 24, receives the hue-and-saturation HS1 of the pixel GE1 from the D latch circuit 29, and receives the RGB values RGB2 of the pixel GE2 and the hue-and-saturation HS2 of the pixel GE2 from the selector 30.

Furthermore, the weight calculating unit 35 receives the RGB values RGB4 of the pixel GE4 from the D latch circuit 21, receives the hue-and-saturation HS4 of the pixel GE4 from the D latch circuit 26, and receives the RGB values RGB3 of the pixel GE3 and the hue-and-saturation HS3 of the pixel GE3 from the selector 31.

That is, the weight calculating units 32 to 35 receive the RGB values and the hues-and-saturations of the pixels GE2 and GE3, the RGB values and the hues-and-saturations of the pixels GE1 and GE4, the RGB values and the hues-and-saturations of the pixels GE1 and GE2, and the RGB values and the hues-and-saturations of the pixels GE3 and GE4 in synchronization with each other. The weight calculating unit 32 then determines the connection weight between the pixel GE2 and the pixel GE3 and outputs the determined connection weight, the weight calculating unit 33 determines the connection weight between the pixel GE1 and the pixel GE4 and outputs the determined connection weight, the weight calculating unit 34 determines the connection weight between the pixel GE1 and the pixel GE2 and outputs the determined connection weight, and the weight calculating unit 35 determines the connection weight between the pixel GE3 and the pixel GE4 and outputs the determined connection weight.

That is, the weight calculating units 32 to 35 determine four connection weights shown in FIG. 3, in one cycle and output the connection weights.

When the selector 30 selects the RGB values RGB3 and the hue-and-saturation HS3 of the pixel GE3 and the selector 31 selects the RGB values RGB2 and the hue-and-saturation HS2 of the pixel GE2, the weight calculating units 32 to 35 determine four connection weights shown in FIG. 4, in one cycle and outputs the connection weights.

Thus, using the RGB values and the hues-and-saturations of four pixels arranged in two rows and two columns, the connection weight determining circuit 2 determines four connection weights between four pixels arranged in the two rows and two columns, in one cycle.

As described above, the connection weight determining circuit 2 uses the RGB values and the hues-and-saturations of individual pixels to determine a connection weight between two pixels, and a reason thereof will be described below.

In the present invention, since not only RGB values but also hues and saturations are used in order to determine a connection weight between pixels, an HSV color space having a hue (H: Hue), a saturation (S: Saturation), and a luminance (V: Value) is employed in addition an the RGB color space.

Here, the hue (H) is an element indicating a color type, such as R, G, and B. The saturation (S) is an element indicating vividness of color and exhibits "0" for achromatic color (black-gray-white). In addition, the luminance (V) is an element indicating brightness.

Figure 5:
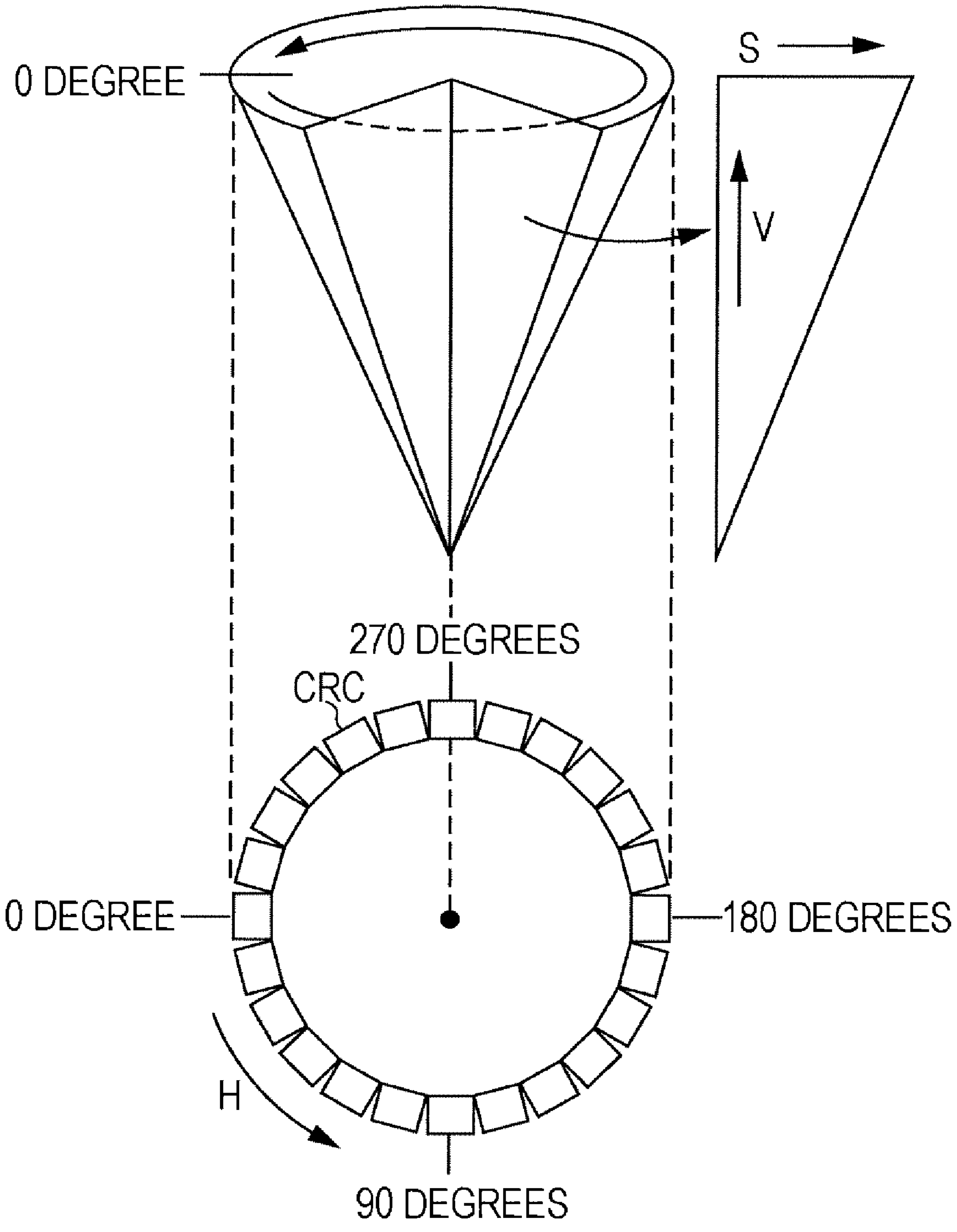
FIG. 5 is a conceptual diagram of an HSV color space.

FIG. 5 is a conceptual diagram of an HSV color space. Referring to FIG. 5, the HSV color space has a conical shape. Further, the hue (H) is drawn on a circular ring CRC at the bottom surface of the conical shape and is expressed in the range of 0 to 360 degrees. FIG. 5 shows hues with red being a reference (0 degree). Red (255, 0, 0), green (0, 255, 0), and blue (0, 0, 255) in the RGB color space correspond to a hue of 0 degree, a hue of 120 degrees, and a hue of 240 degrees, respectively.

The saturation (S) is expressed as the radius of the circular shape of the cone and takes a value in the range of 0 to 1. The luminance (V) is expressed as a distance from the vertex of the cone and takes a value in the range of 0 to 1.

As can be seen from FIG. 5, achromatic color has no hue (H) and no saturation (S).

RGB values are converted into a hue (H) by using the following expression:

[Expression 1]

$$H = \left\{ \begin{array}{l} 60 \times \frac{G-B}{\mathrm{MAX}-\mathrm{MIN}} + 0 \text{ (In the case of if MAX} = R) \\ 60 \times \frac{B-R}{\mathrm{MAX}-\mathrm{MIN}} + 120 \text{ (In the case of if MAX} = G) \\ 60 \times \frac{R-G}{\mathrm{MAX}-\mathrm{MIN}} + 240 \text{ (In the case of if MAX} = B) \end{array} \right\} \quad (1)$$

In expression (1), MAX indicates a maximum value of the R value, G value, and B value, and MIN indicates a minimum value of the R value, G value, and B value.

For MAX=MIN, the hue (H) is not defined. This is because it happens when all of the R value, the G value, and the B value are equal to each other and indicates achromatic color and thus hue values at the time are meaningless since the color lies in the vicinity of the gray line at the center of the cone.

RGB values are converted into a saturation (S) by using the following expression:

[Expression 2]

$$S = \frac{MAX - MIN}{MAX} \quad (2)$$

For MAX=0, the saturation (S) is not defined. This is because color for MAX=0 represents complete black, which thus has neither a hue nor a saturation.

RGB values are converted into a luminance (V) by using the following expression:

[Expression 3]

$$V = MAX \quad (3)$$

Figure 6:
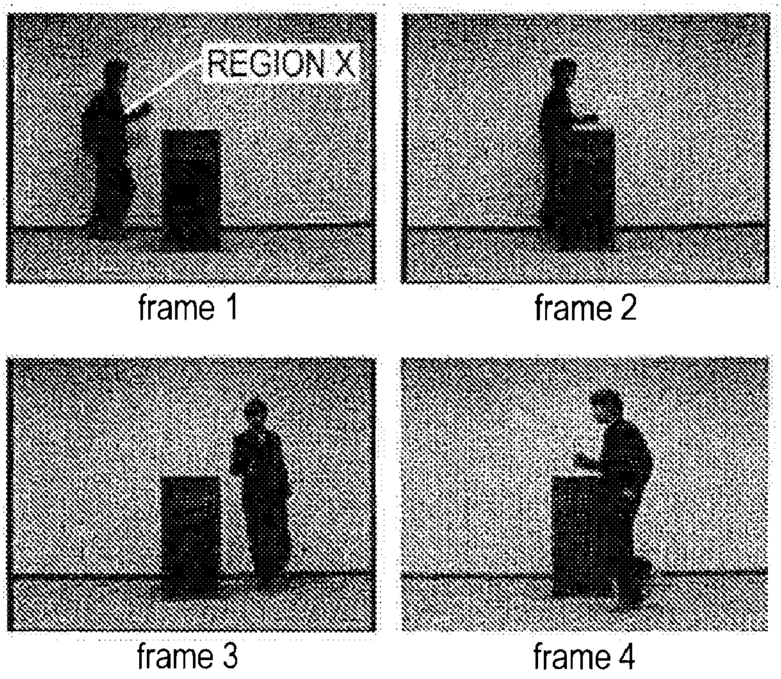
FIG. 6 is a figure showing images used for image evaluation based on hues and saturations.
Figure 7:
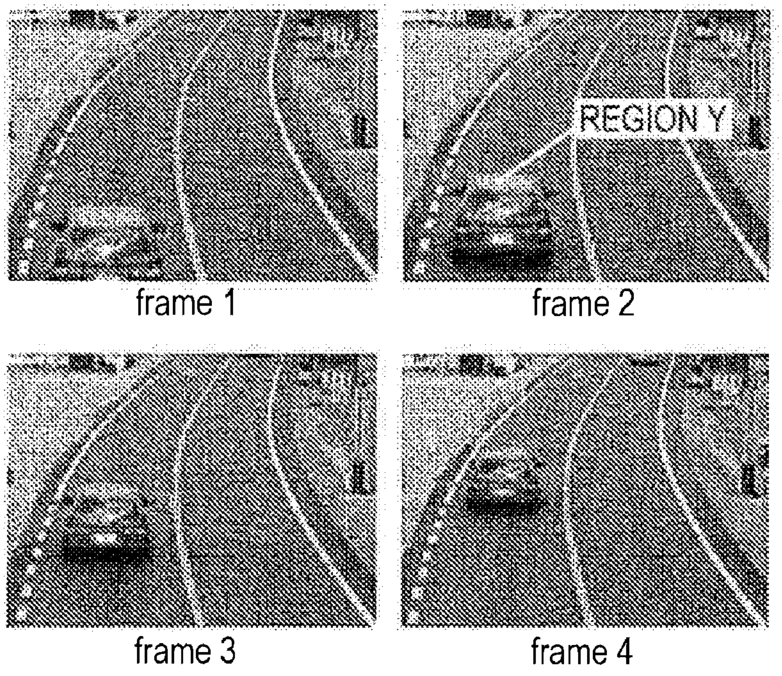
FIG. 7 is a figure showing other images used for image evaluation based on hues and saturations.

Next, image evaluation based on hues (Hue) and saturations (Saturation) will be described. FIG. 6 is a figure showing images using image evaluation based on hues and saturations. FIG. 7 is a figure showing other images using image evaluation based on hues and saturations.

FIG. 6 shows images containing low-contrast regions and FIG. 7 shows images containing ambient reflection.

Figure 8:
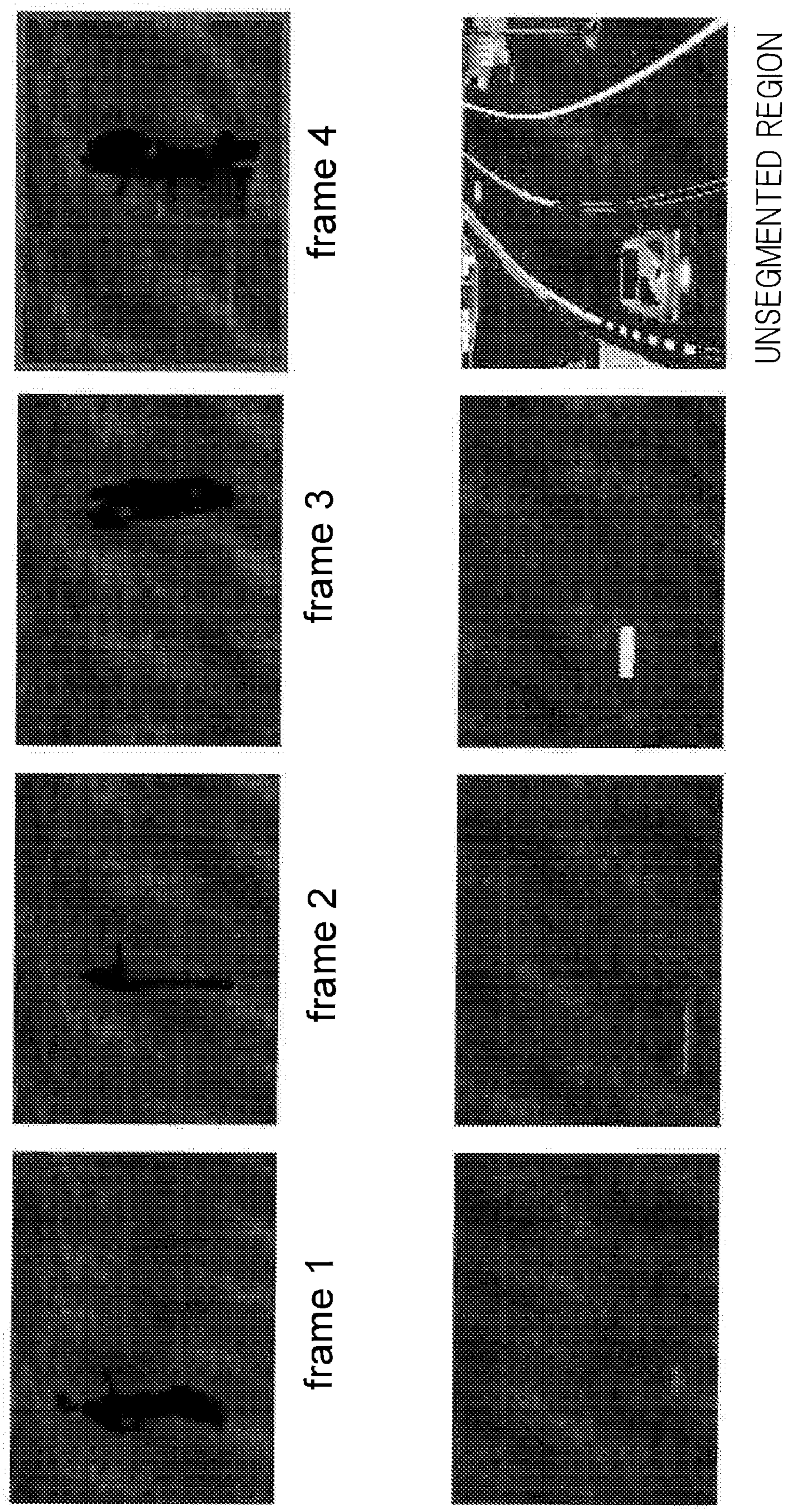
FIG. 8 is a figure showing a segmentation result of a region X shown in FIG. 6 and a segmentation result of a region Y shown in FIG. 7.
Figure 9:
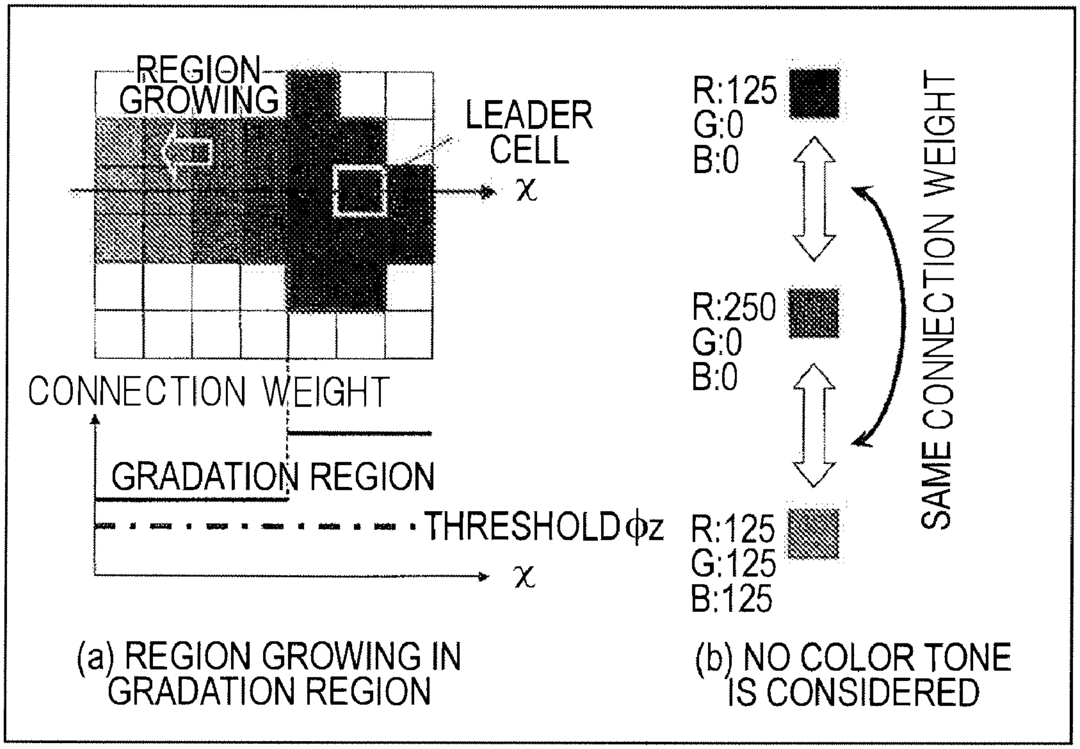
FIG. 9 is a diagram for describing a problem in conventional image segmentation.

FIG. 8 is a figure showing a result of segmentation of a region X shown in FIG. 6 and a result of segmentation of a region Y shown in FIG. 7. FIG. 9 is a diagram for describing a problem in conventional image segmentation.

In the conventional image segmentation, a connection weight $W_{ij;kl}$ between two pixels is computed by the following expressions (4) and (5) using only the RGB values of the pixels.

[Expression 4]

$$\left.\begin{aligned} W_{ij;kl}(R) &= \frac{I_{max}(R)}{1 + |I_{ij}(R) - I_{kl}(R)|} \\ W_{ij;kl}(G) &= \frac{I_{max}(G)}{1 + |I_{ij}(G) - I_{kl}(G)|} \\ W_{ij;kl}(B) &= \frac{I_{max}(B)}{1 + |I_{ij}(B) - I_{kl}(B)|} \end{aligned}\right\} \quad (4)$$

[Expression 5]

$$W_{ij;kl} = \min\{W_{ij;kl}(R), W_{ij;kl}(G), W_{ij;kl}(B)\} \quad (5)$$

That is, in the conventional image segmentation method, a similarity between pixels which is referred to as a “connection weight” is determined from a difference in luminance values between adjacent pixels and the determined similarity is used as an indicator to grow a region. The connection weight $W_{ij;kl}$ is determined by substituting three connection weights, computed for red, green, and blue by using expression (4), into expression (5) and selecting the smallest one of the three connection weights for red, green, and blue as the connection weight $W_{ij;kl}$ between the pixels.

Thus, as shown in FIG. 9, for example, the connection weight between (R, G, B)=(250, 0, 0) and (R, G, B)=(125, 0, 0) and the connection weight between (R, G, B)=(250, 0, 0) and (R, G, B)=(125, 125, 125) have the same values, although they have a relationship of achromatic color and chromatic color. Thus, for the connection weight using the RGB color space, no color tone of pixels is considered.

Also, FIG. 9(*a*) is a figure showing a region having a gradation change for each pixel and showing, as a graph, a change in the connection weight in a gradation region when the horizontal axis indicates an x axis and the vertical axis indicates the connection weight.

Since the differences in the luminance values between pixels are equal to each other in regions having gradation changes, the connection weights are also equal to each other. If the connection weights of neighborhood pixels are greater than or equal to a threshold ϕz used for region growth, the region continues to expand in an arrow direction.

However, with respect to the problem regarding the gradation shown in FIG. 9(*a*), up to which region the region is treated as an identical region is strongly dependent on an application, and it is thus difficult to uniquely determine the threshold.

The sample images shown in FIG. 6 are (gradation) images in which the contrast is low, a shade arises at a border as a result of overlapping of a desk and a human, no distinct edge appears between the desk region and the person region, and the color changes smoothly between the two regions. Thus, with the conventional image segmentation method utilizing edges, it is difficult to divide the desk and the person (see FIG. 8).

Also, in the sample images shown in FIG. 7, color changes due to reflection, a body region splits into multiple regions or remains as an unsegmented region without progress of growth of the body region (see FIG. 8).

These results show that an improvement in the image segmentation accuracy requires consideration of a color tone, such as black, red, and blue, in addition to the method using the luminance in the RGB color space. When the color tone is considered, the person is black and the desk is brown in the case of the sample images shown in FIG. 6 and it is possible to perform segmentation of two regions. Also, in the case of the sample images shown in FIG. 7, the vehicle can be extracted as a red region.

Thus, image evaluation based on hues (Hue) and saturations (Saturation) will be described.

Figure 10:
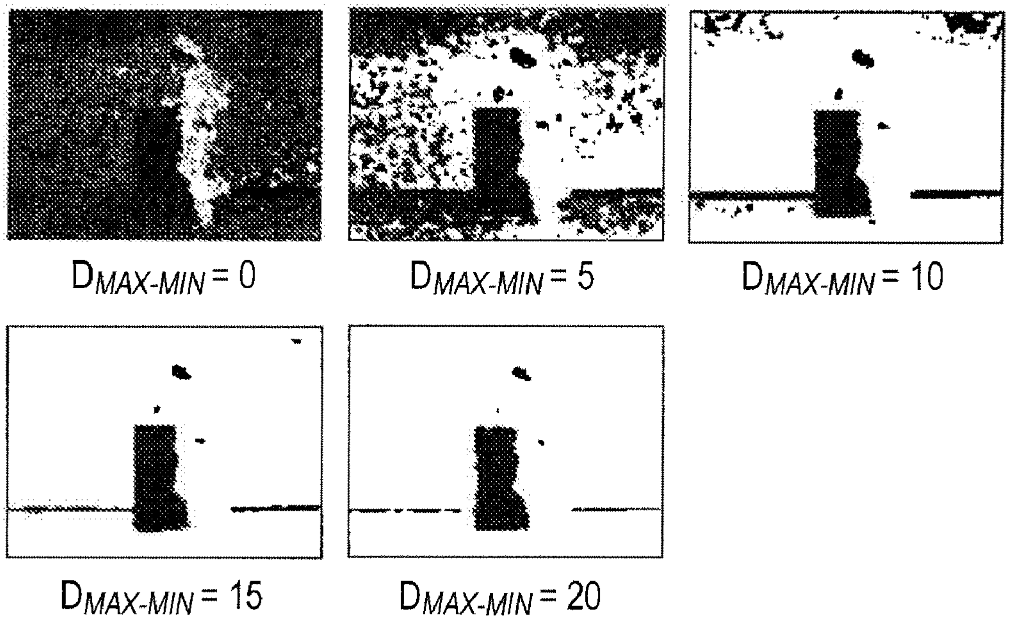
FIG. 10 is a figure of 8-bit gray images obtained by normalizing values (0 to 360 degrees), converted from RGB values of the sample images shown in FIG. 6 into hue values by using expression (1), into 256 shades.
Figure 11:
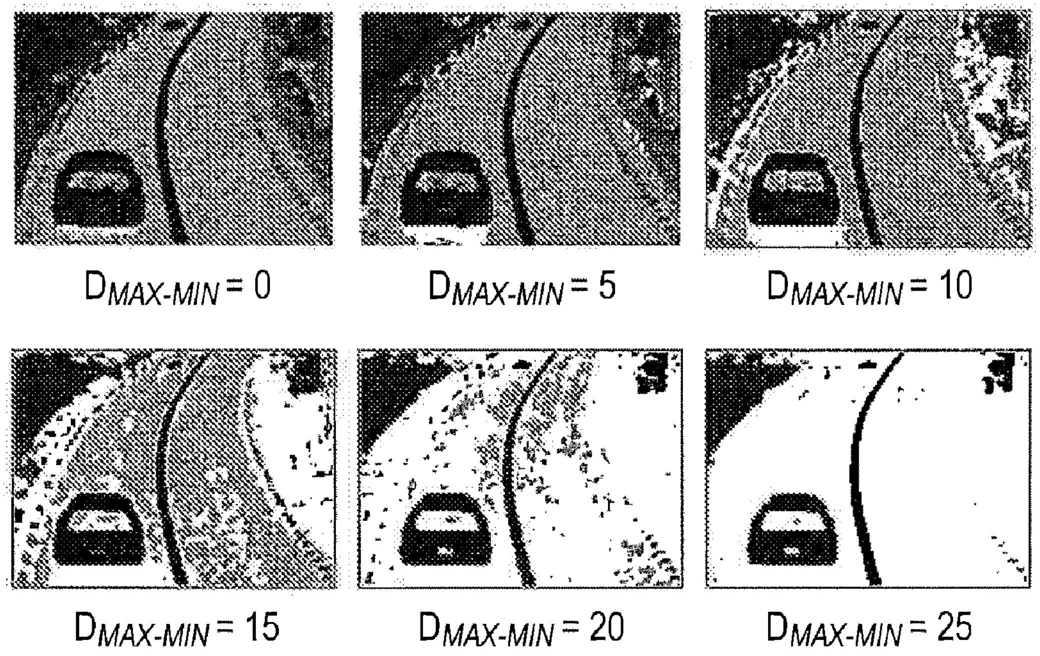
FIG. 11 is a figure of 8-bit gray images obtained by normalizing values (0 to 360 degrees), converted from RGB values of the sample images shown in FIG. 7 into hue values by using expression (1), into 256 shades.

Image evaluation based on hues (Hue) will first be described. FIG. 10 is a figure of 8-bit gray images obtained by normalizing values (0 to 360 degrees), converted from RGB values of the sample images shown in FIG. 6 into hue values by using expression (1), into 256 shades. FIG. 11 is a figure of 8-bit gray images obtained by normalizing values (0 to 360 degrees), converted from RGB values of the sample images shown in FIG. 7 into hue values by using expression (1), into 256 shades.

In two samples images shown in FIGS. 6 and 7, pixel value with a high hue-value, such as green and blue, does not exist. Thus, in FIGS. 10 and 11, the achromatic color is expressed by 255 (white), which is the maximum value.

Referring to FIGS. 10 and 11, though it can be seen that the boundary between the human and the desk and the boundary between the road and the vehicle are clearly discriminated, noise pixels are conspicuous in the background and the human region. When it is assumed that hue images are applied to image segmentation, it is apprehensive that noise pixels affect the segmentation accuracy.

Accordingly, for noise pixel reduction, the following method is employed. As can be understood from expression (1), strictly speaking, a color is treated as achromatic color, only for MAX−MIN=0. However, when the human visually recognizes color in practice, he or she recognizes pixels as achromatic color even when MAX−MIN=0 is not strictly satisfied. Thus, parameter $D_{MAX-MIN}$ is set in order to eliminate noise pixels.

$D_{MAX-MIN}$ in FIGS. 10 and 11 represents $D_{MAX-MIN}$=MAX−MIN and it is assumed that a pixel having a smaller error than $D_{MAX-MIN}$ has achromatic color (white-gray-black). Results of evaluation with respect to an influence on an image when the $D_{MAX-MIN}$ value is incremented from "0" by "5" are results shown in FIGS. 10 and 11.

It was found that when the $D_{MAX-MIN}$ value is increased, achromatic color is eliminated and color regions (chromatic regions) and gray regions (achromatic regions) can be separated to some degree. This is because robustness in discrimination between the gray regions and the color regions has improved. It is also possible to discriminate between color regions by using a difference between hue values.

Figure 12:
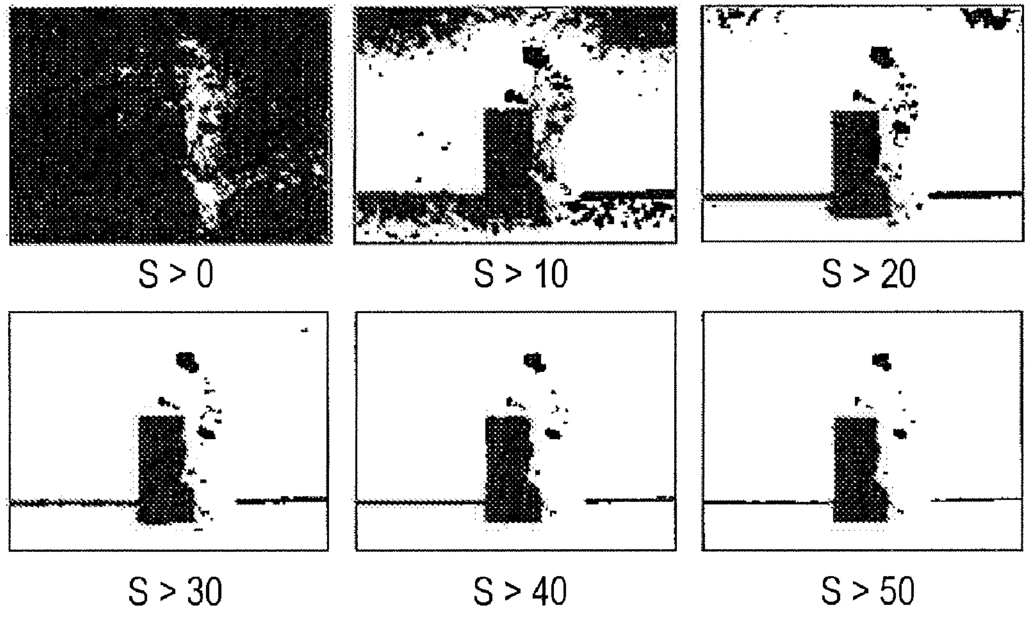
FIG. 12 is a figure of 8-bit gray images obtained by normalizing values (in the range of 0 to 1), converted from RGB values of the sample images shown in FIG. 6 into S values by using expression (2), into 256 shades.
Figure 13:
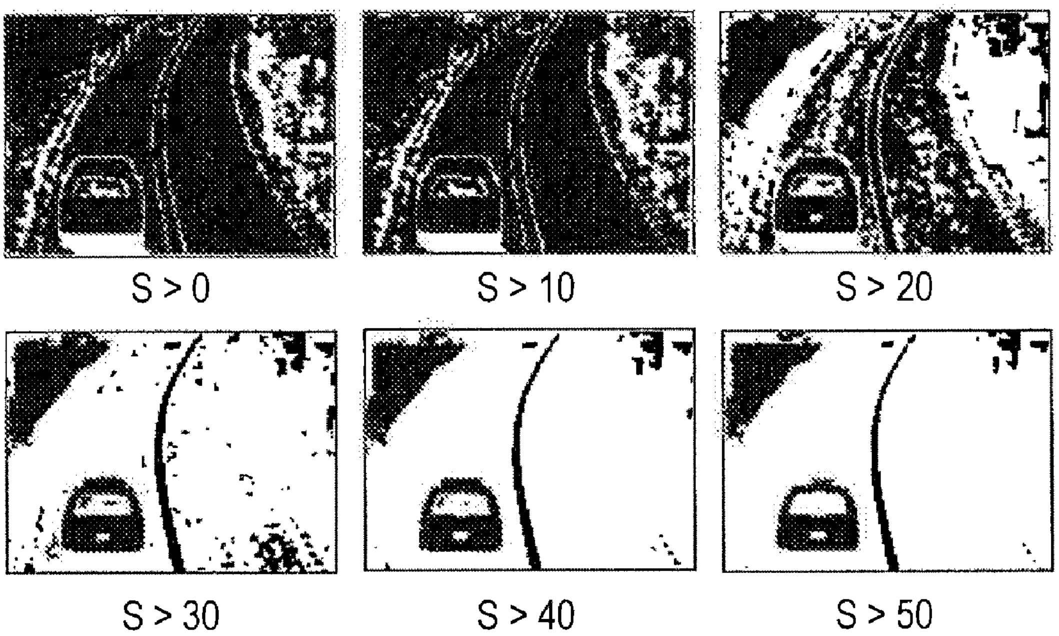
FIG. 13 is a figure of 8-bit gray images obtained by normalizing values (in the range of 0 to 1), converted from RGB values of the sample images shown in FIG. 7 into S values by using expression (2), into 256 shades.

Next, image evaluation based on saturations (Saturation) will be described. FIG. 12 is a figure of 8-bit gray images obtained by normalizing values (in the range of 0 to 1), converted from RGB values of the sample images shown in FIG. 6 into S values by using expression (2), into 256 shades. FIG. 13 is a figure of 8-bit gray images obtained by normalizing values (in the range of 0 to 1), converted from RGB values of the sample images shown in FIG. 7 into S values by using expression (2), into 256 shades.

In the case of the saturations, only for MAX−MIN=0 or MAX=0, a color is treated as achromatic color. Thus, the road region and so on also have saturations.

Accordingly, digitization of achromatic regions and chromatic regions by using the value of the S value of each pixel as a threshold will be discussed, with attention being paid to the fact that it is very difficult to perform color discrimination based on hues (H) with respect to a region having low saturations (S), as can be understood from FIG. 5.

FIGS. 12 and 13 show influences on the images when the saturation (S) that serves as a threshold is varied from 0 to 50 in increments of 10. The images shown in FIGS. 12 and 13 are images digitized by regarding, as white (255), a pixel having a saturation (S) that is smaller than the threshold and regarding, as black (0), a pixel having a saturation that is greater than or equal to the threshold.

Referring to FIGS. 12 and 13, a better result with respect to discrimination between achromatic regions and chromatic regions was obtained by treating, as achromatic color, a pixel whose saturation (S) value is smaller than 50 and treating, as chromatic color, a pixel whose saturation (S) value is greater than or equal to 50. Other sample images were also evaluated and, when the threshold for the saturation was set to appropriately 50, a better result was obtained.

As described above, a result of study of the HSV color space showed that the use of the HSV color space for an image (e.g., separation of the person and the desk shown in FIG. 6 and extraction of the vehicle body portion shown in FIG. 7), on which it has been difficult to perform image segmentation in the RGB color space, makes it possible to separate a color region and a color that is close to achromatic color when viewed by the human eyes and also makes it possible to segment, as an identical region, a region in which lightness and saturation differences occur due to how light is incident even when the color tones are the same.

However, the HSV color space is not suitable for image segmentation of achromatic regions. This is because, when the saturation becomes low, it is almost impossible to discriminate a color tone and the hue value becomes meaningless, as can be understood from FIG. 5.

Accordingly, in the present invention, the color spaces for both RGB values and the HSV values are used to determine connection weights between pixels, so as to mutually compensate for color regions to which the respective color spaces are not suitable.

Then, when the connection weight determining circuit 2 determines a connection weight by using the RGB values and the hues-and-saturations, the HS converting circuit 25 generally uses expressions (1) and (2) to convert the RGB values into hues (H) and saturations (S).

However, when expressions (1) and (2) are used to convert the RGB values into hues (H) and saturations (S), it is necessary to configure the HS converting circuit 25 by using a divider, and a method for realizing the HS converting circuit 25 using a divider requires a plurality of cycles for computation. Thus, the processing requirement in one cycle cannot be satisfied. There is also a problem of an increased circuit area.

Accordingly, a method using table mapping can be conceived. That is, H values and S values obtained by pre-calculating the RGB values by using expressions (1) and (2) are stored in a memory and a calculation result is read from an address corresponding to the RGB values, thereby reducing the amount of processing during use.

However, since each of R, G, and B is 8-bit data, a large-capacity memory for $((2^8)^3 \times 9)$ bits is required. Thus, there is a problem of an increased circuit area of the decoder.

Accordingly, in the present invention, preferably, H (0 to 360 degrees) and S (0 to 1) are divided into a plurality of bins (areas), so that the calculation result is limited to the number of bins and a hue (H) and a saturation (S) are further determined by referring to a table. According to this method, it is possible to realize an RGB-value to HSV-value converting circuit having a reduced circuit area, without use of any divider.

Figure 14:
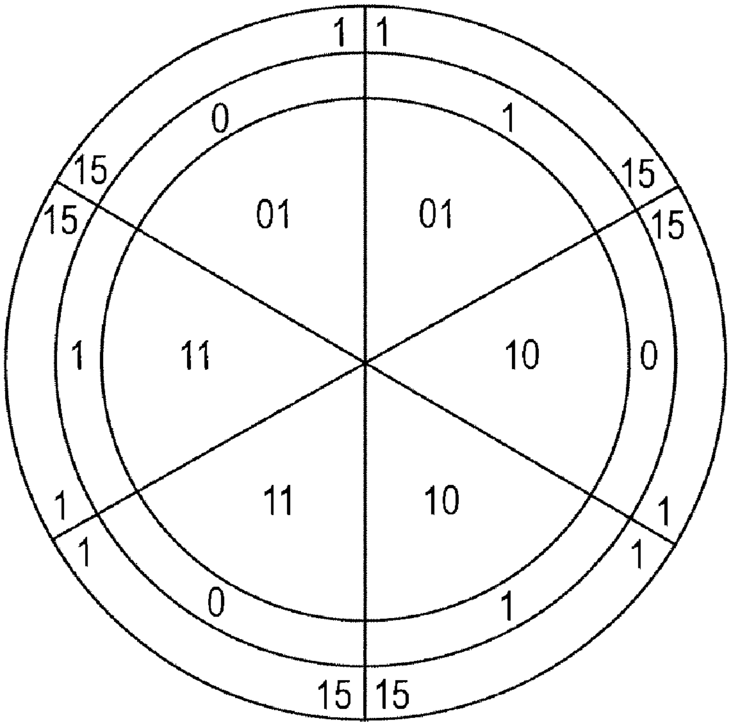
FIG. 14 is a configuration diagram of hue (Hue) bins.

FIG. 14 is a configuration diagram of hue (Hue) bins. Referring to FIG. 14, the hue (Hue) bin configuration has three-stage configuration in which 360-degree hue values are constituted by 90 bins.

A method for determining a hue value will be described. First, to which category of red (01), green (10), and blue (11) in a first stage (an innermost circle) a pixel of interest belongs is determined based on MAX.

Next, MIN is determined and whether the expression fractional portion corresponding to a condition of MAX is positive or negative is determined from expression (1). When the fractional portion is negative, "0" is obtained, and when the fractional portion is positive, "1" is obtained (a second stage).

Lastly, determining to which of the 15 bins the pixel of interest corresponds makes it possible to know to which bin of the hue values constituted by 90 bins the pixel of interest corresponds (a third stage).

In the above-described hue-value determining method, it is possible to easily determine the hue value up to the second stage, on the basis of the magnitude relationship of the R, G, and B values. Thus, a method for determining bins 1 to 15 in the third stage will be described.

The fractional portion in expression (1) is extracted to create the following relational expression.

[Expression 6]

$$\frac{MED - \mathrm{MIN}}{\mathrm{MAX} - \mathrm{MIN}} < \frac{X}{15} \; (X\colon 1, 2, 3, \ldots , 14) \tag{6}$$

In expression (6), MED indicates the value of one of R, G, and B other than MAX and MIN, that is, indicates a medium value.

Transformation of expression (6) yields the following expression.

[Expression 7]

$$\underbrace{15\times(MED-\mathrm{MIN})}_{A}<\underbrace{X\times(\mathrm{MAX}-\mathrm{MIN})}_{B}\ (X:\ 1,2,3,\ldots,14) \quad (7)$$

Then, a bin number is determined from results of satisfactions of 14 inequality expressions generated when the value of X in expression (7) is varied from 1 to 14.

Figure 15:
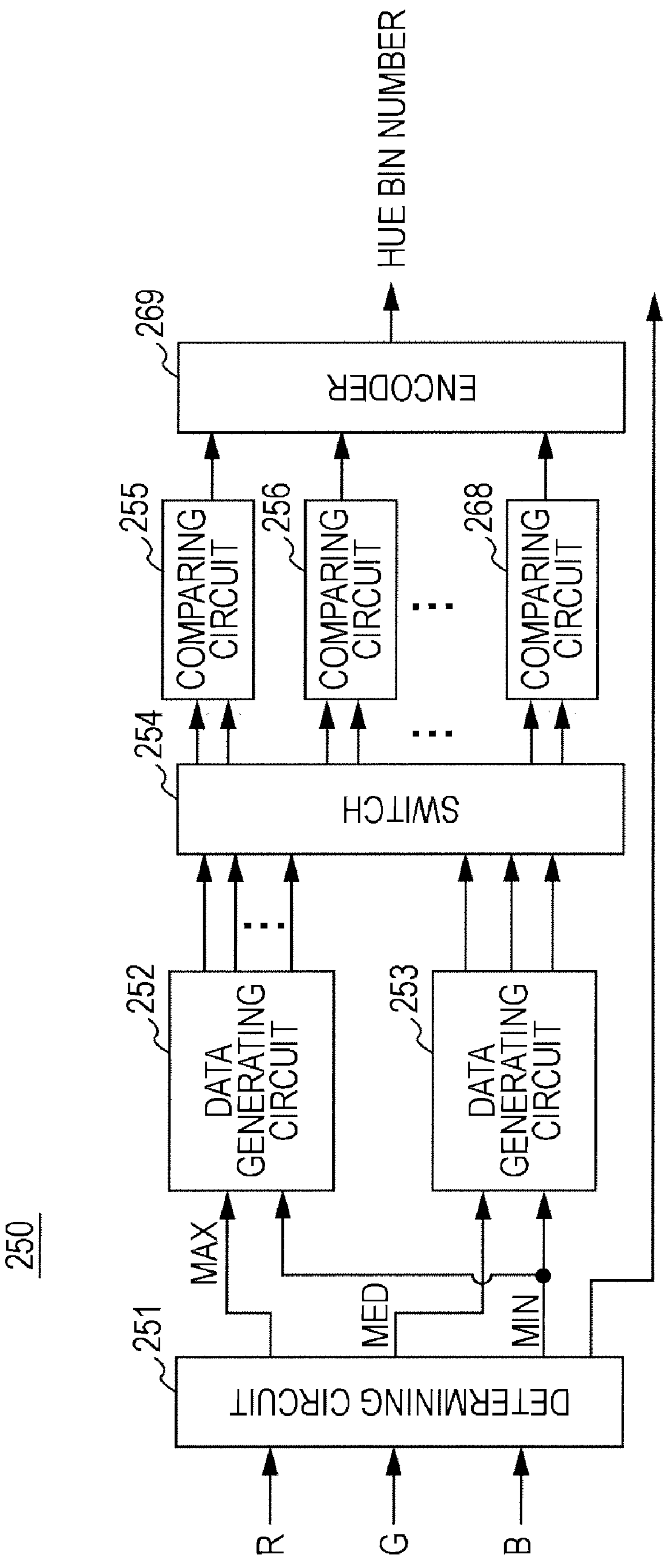
FIG. 15 is a schematic diagram showing the configuration of a hue converting circuit included in an HS converting circuit shown in FIG. 2.

FIG. 15 is a schematic diagram showing the configuration of a hue converting circuit included in the HS converting circuit 25 shown in FIG. 2. The HS converting circuit 25 includes a hue converting circuit 250 shown in FIG. 15. Referring to FIG. 15, the hue converting circuit 250 includes a determining circuit 251, data generating circuits 252 and 253, a switch 254, comparing circuits 255 to 268, and an encoder 269.

The determining circuit 251 receives the RGB values of each pixel from the pixel-value detecting circuit 1 and determines the maximum value MAX, the minimum value MIN, and the medium value MED of the received RGB values. The determining circuit 251 then outputs the determined maximum value MAX to the data generating circuit 252, outputs the medium value MED to the data generating circuit 253, and outputs the minimum value MIN to the data generating circuits 252 and 253.

The data generating circuit 252 receives the maximum value MAX and the minimum value MIN from the determining circuit 251. On the basis of the received maximum value MAX and minimum value MIN, the data generating circuit 252 sequentially computes fourteen X×(MAX−MIN) obtained by varying X from 1 to 14, and outputs the computed fourteen X×(MAX−MIN) (X=1 to 14) to the switch 254. That is, the data generating circuit 252 computes B on the right side in expression (7) and outputs the computed B to the switch 254.

The data generating circuit 253 receives the medium value MED and the minimum value MIN from the determining circuit 251. The data generating circuit 253 sequentially computes 15×(MED−MIN) on the basis of the received medium value MED and minimum value MIN, and outputs the computed 15×(MED−MIN) to the switch 254. That is, the data generating circuit 253 computes A on the left side in expression (7) and outputs the computed A to the switch 254.

The switch 254 receives the fourteen X×(MAX−MIN) (X=1 to 14) from the data generating circuit 252 and receives 15×(MED−MIN) from the data generating circuit 253. The switch 254 outputs 1×(MAX−MIN) and 15×(MED−MIN) to the comparing circuit 255, outputs 2×(MAX−MIN) and 15×(MED−MIN) to the comparing circuit 256, and likewise outputs the 14×(MAX−MIN) and 15×(MED−MIN) to the comparing circuit 268.

The comparing circuit 255 receives 1×(MAX−MIN) and 15×(MED−MIN) from the switch 254 and compares 1×(MAX−MIN) with 15×(MED−MIN). The comparing circuit 255 then outputs the comparison result to the encoder 269. More specifically, when 15×(MED−MIN)<1×(MAX−MIN) is satisfied, the comparing circuit 255 outputs "1" to the encoder 269, and when 15×(MED−MIN)<1×(MAX−MIN) is not satisfied, the comparing circuit 255 outputs "0" to the encoder 269.

The comparing circuit 256 receives 2×(MAX−MIN) and 15×(MED−MIN) from the switch 254 and compares 2×(MAX−MIN) with 15×(MED−MIN). The comparing circuit 256 then outputs the comparison result (1 or 0) to the encoder 269.

Likewise, the comparing circuit 268 receives 14×(MAX−MIN) and 15×(MED−MIN) from the switch 254 and compares 14×(MAX−MIN) with 15×(MED−MIN). The comparing circuit 268 then outputs the comparison result (1 or 0) to the encoder 269.

The comparing circuits 255 to 268 compare X×(MAX−MIN) with 15×(MED−MIN) in parallel and output the comparison results to the encoder 269 in parallel. Thus, the encoder 269 receives, from the comparing circuits 255 to 268, 14-bit data indicating the comparison results.

The encoder 269 receives the comparison results having 14 bits from the comparing circuits 255 to 268, and determines a bin number on the basis of the received 14-bit comparison results. More specifically, upon receiving comparison results "01000000000000" from the comparing circuits 255 to 268, the encoder 269 determines that the bin number is "2", and upon receiving comparison results "00000000010000" from the comparing circuits 255 to 268, the encoder 269 determines that the bin number is "10". Upon receiving comparison results "00000000000000", all of which are "0", from the comparing circuits 255 to 268, the encoder 269 determines that the bin number is "15".

The encoder 269 then outputs the determined bin number to the D latch circuit 26 as a hue bin number.

As described above, since the data generating circuit 252 computes X×(MAX−MIN) and the data generating circuit 253 computes 15×(MED−MIN), each of the data generating circuits 252 and 253 can be realized by a simple circuit using an adder and a shifter.

Figure 16:
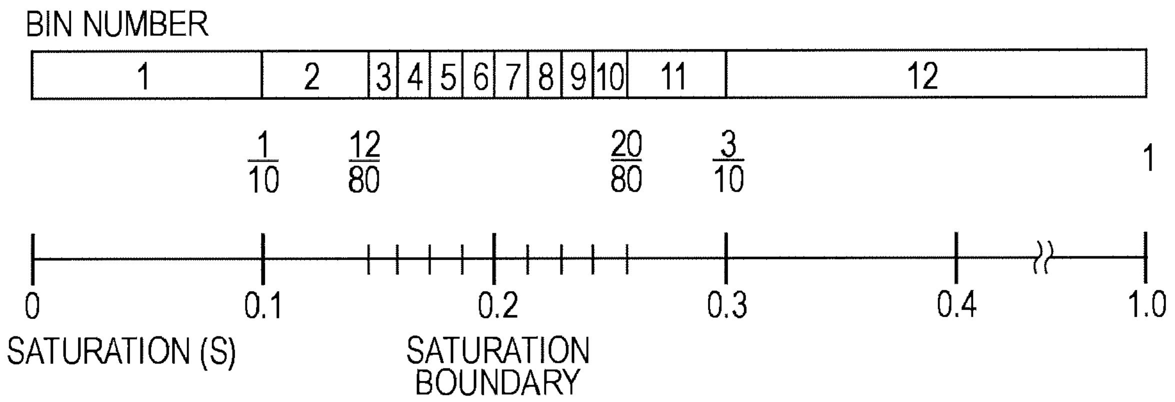
FIG. 16 is a configuration diagram of saturation (S) bins.

Next, conversion from RGB values into a saturation (S) will be described. FIG. 16 is a configuration diagram of saturation (S) bins. Referring to FIG. 16, a saturation (S) in the range of 0 to 0.1 is assigned to a bin 1, a saturation (S) in the range of 0.1 to 0.15 is assigned to a bin 2, a saturation (S) in the range of 0.15 to 0.1625 is assigned to a bin 3, a saturation (S) in the range of 0.1625 to 0.1750 is assigned to a bin 4, a saturation (S) in the range of 0.1750 to 0.1875 is assigned to a bin 5, a saturation (S) in the range of 0.1875 to 0.2 is assigned to a bin 6, a saturation (S) in the range of 0.2 to 0.2125 is assigned to a bin 7, a saturation (S) in the range of 0.2125 to 0.2250 is assigned to a bin 8, a saturation (S) in the range of 0.2250 to 0.2375 is assigned to a bin 9, a saturation (S) in the range of 0.2375 to 0.25 is assigned to a bin 10, a saturation (S) in the range of 0.25 to 0.30 is assigned to a bin 11, and a saturation (S) in the range of 0.3 to 1.0 is assigned to a bin 12.

In this manner, a saturation (S) is assigned to a more finely divided bin as it is closer to the vicinity of 0.2, which is the saturation boundary.

The conversion from RGB values into a saturation (S) also uses a method that is similar to the conversion from RGB values into a hue (H). The calculation of a saturation (S) is required when one of two pixels belongs to an achromatic region and the other pixel belongs to a chromatic region, that is, when two pixels have a relationship in which the saturation boundary (S=0.2) is sandwiched therebetween.

Accordingly, as shown in FIG. 16, segmentation is performed into small bins limiting to the vicinity of the saturation boundary (S=0.2). With the saturation bins, a saturation is assigned to 12 bins on the basis of results of satisfactions of the following two expressions (8) an (9).

[Expression 8]

$$\frac{MAX - MIN}{MAX} < \frac{Y}{20} \; (Y\text{: } 2, 3, 6) \tag{8}$$

[Expression 9]

$$\frac{MAX - MIN}{MAX} < \frac{Z}{80} \; (12 \le Z \le 20) \tag{9}$$

Elimination of the denominators in expressions (8) and (9) yields expressions (10) and (11), respectively.

[Expression 10]

$$\underbrace{20 \times (MAX - MIN)}_{C} < \underbrace{Y \times MAX}_{D} \; (Y\text{: } 2, 3, 6) \tag{10}$$

[Expression 11]

$$\underbrace{80 \times (MAX - MIN)}_{E} < \underbrace{Z \times MAX}_{F} \; (12 \le Z \le 20) \tag{11}$$

Figure 17:
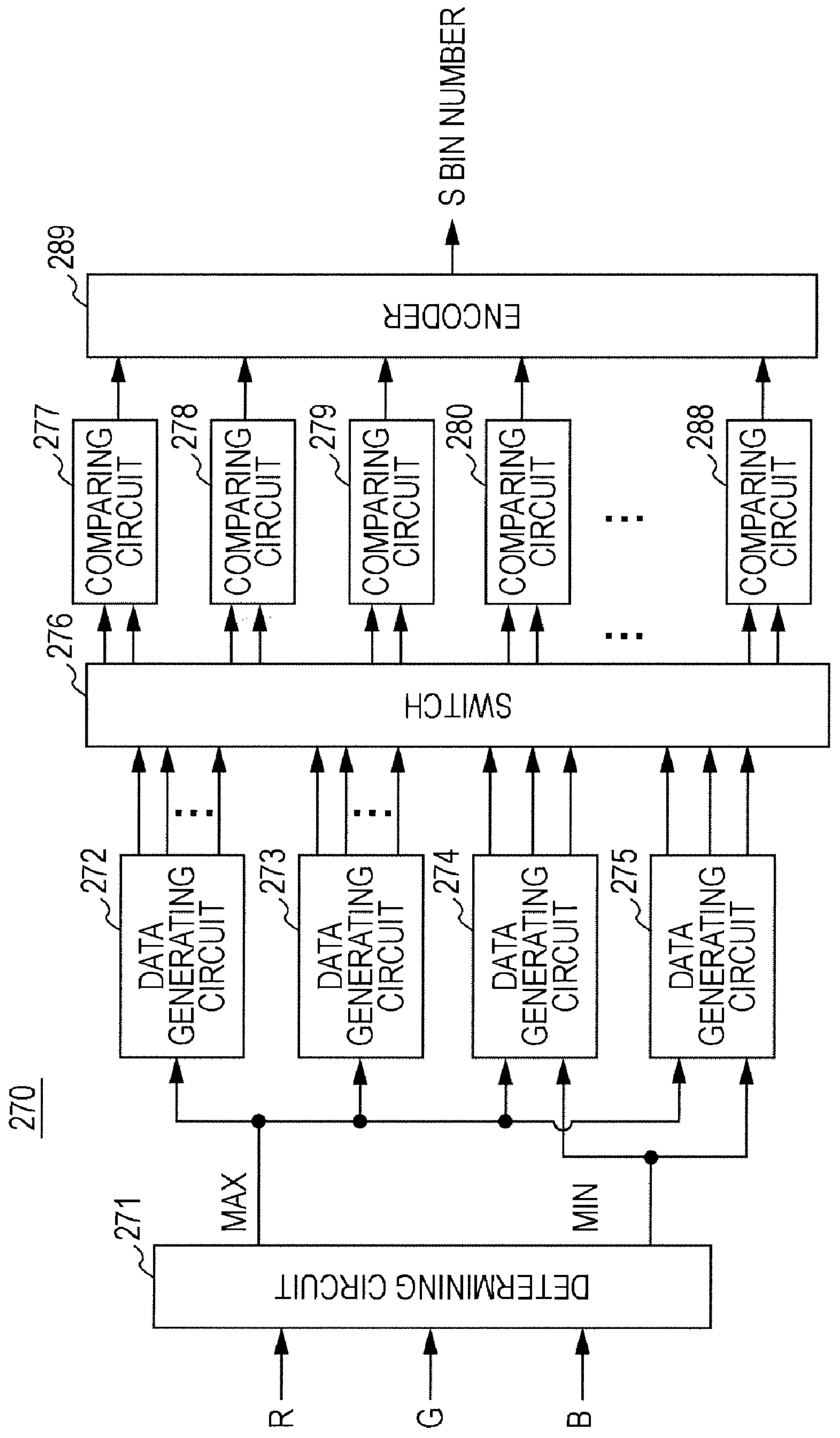
FIG. 17 is a schematic diagram showing the configuration of a saturation converting circuit included in the HS converting circuit shown in FIG. 2.

FIG. 17 is a schematic diagram showing the configuration of a saturation converting circuit included in the HS converting circuit 25 shown in FIG. 2. The HS converting circuit 25 includes a saturation converting circuit 270 shown in FIG. 17. Referring to FIG. 17, the saturation converting circuit 270 includes a determining circuit 271, data generating circuits 272 to 275, a switch 276, comparing circuits 277 to 288, and an encoder 289.

The determining circuit 271 receives the RGB values from the pixel-value detecting circuit 1 and determines the maximum value MAX and the minimum value MIN of the received RGB values. The determining circuit 271 then outputs the determined maximum value MAX to the data generating circuits 272 to 275 and outputs the determined minimum value MIN to the data generating circuits 274 and 275.

The data generating circuit 272 receives the maximum value MAX from the determining circuit 271. Using the received maximum value MAX, the data generating circuit 272 sequentially computes Y×MAX obtained by varying Y from 2 to 6 through 3 and outputs the three Y×MAX (Y=2, 3, and 6) to the switch 276. That is, the data generating circuit 272 computes D on the right side in expression (10) and outputs the computed D to the switch 276.

The data generating circuit 273 receives the maximum value MAX from the determining circuit 271. Using the received maximum value MAX, the data generating circuit 273 sequentially computes Z×MAX obtained by varying Z from 12 to 20, and outputs the computed nine Z×MAX (Z=12 to 20) to the switch 276. That is, the data generating circuit 273 computes F on the right side in expression (11) and outputs the computed F to the switch 276.

The data generating circuit 274 receives the maximum value MAX and the minimum value MIN from the determining circuit 271. The data generating circuit 274 computes 20×(MAX−MIN) by using the received maximum value MAX and minimum value MIN and outputs the computed 20×(MAX−MIN) to the switch 276. That is, the data generating circuit 274 computes C on the left side in expression (10) and outputs the computed C to the switch 276.

The data generating circuit 275 receives the maximum value MAX and the minimum value MIN from the determining circuit 271. The data generating circuit 275 computes 80×(MAX−MIN) by using the received maximum value MAX and minimum value MIN and outputs the computed 80×(MAX−MIN) to the switch 276. That is, the data generating circuit 275 computes E on the left side in expression (11) and outputs the computed E to the switch 276.

The switch 276 receives the three Y×MAX (Y=2, 3, and 6) from the data generating circuit 272, receives the nine Z×MAX (Z=12 to 20) from the data generating circuit 273, receives 20×(MAX−MIN) from the data generating circuit 274, and receives 80×(MAX−MIN) from the data generating circuit 275.

The switch 276 then outputs 2×MAX and 20×(MAX−MIN) to the comparing circuit 277, outputs 3×MAX and 20×(MAX−MIN) to the comparing circuit 278, and outputs 6×MAX and 20×(MAX−MIN) to the comparing circuit 279.

The switch 276 also outputs 12×MAX and 80×(MAX−MIN) to the comparing circuit 280, outputs 13×MAX and 80×(MAX−MIN) to the comparing circuit 281, and likewise outputs 20×MAX and 80×(MAX−MIN) to the comparing circuit 288.

The comparing circuit 277 receives 2×MAX and 20×(MAX−MIN) from the switch 276, compares 2×MAX with 20×(MAX−MIN), and outputs the comparison result to the encoder 289. More specifically, when 20×(MAX−MIN)<2×MAX is satisfied, the comparing circuit 277 outputs "1" to the encoder 289, and when 20×(MAX−MIN)<2×MAX is not satisfied, the comparing circuit 277 outputs "0" to the encoder 289.

The comparing circuit 278 also receives 3×MAX and 20×(MAX−MIN) from the switch 276 and compares 3×MAX with 20×(MAX−MIN). When 20×(MAX−MIN)<3×MAX is satisfied, the comparing circuit 278 outputs "1" to the encoder 289, and when 20×(MAX−MIN)<3×MAX is not satisfied, the comparing circuit 278 outputs "0" to the encoder 289.

Likewise, the comparing circuit 279 receives 6×MAX and 20×(MAX−MIN) from the switch 276 and compares 6×MAX with 20×(MAX−MIN). When 20×(MAX−MIN)<6×MAX is satisfied, the comparing circuit 279 outputs "1" to the encoder 289, and when 20×(MAX−MIN)<6×MAX is not satisfied, the comparing circuit 279 outputs "0" to the encoder 289.

The comparing circuit 280 receives 12×MAX and 80×(MAX−MIN) from the switch 276, compares 12×MAX with 80×(MAX−MIN), and outputs the comparison result to the encoder 289. More specifically, when 80×(MAX−MIN)<12×MAX is satisfied, the comparing circuit 280 outputs "1" to the encoder 289, and when 80×(MAX−MIN)<12×MAX is not satisfied, the comparing circuit 280 outputs "0" to the encoder 289.

The comparing circuit 281 receives 13×MAX and 80×(MAX−MIN) from the switch 276 and compares 13×MAX with 80×(MAX−MIN). When 80×(MAX−MIN)<13×MAX is satisfied, the comparing circuit 281 outputs "1" to the encoder 289, and when 80×(MAX−MIN)<13×MAX is not satisfied, the comparing circuit 281 outputs "0" to the encoder 289.

Likewise, the comparing circuit 288 receives 20×MAX and 80×(MAX−MIN) from the switch 276 and compares 20×MAX with 80×(MAX−MIN). When 80×(MAX−MIN)<20×MAX is satisfied, the comparing circuit 288 outputs "1" to the encoder 289, and when 80×(MAX−MIN)<20×MAX is not satisfied, the comparing circuit 288 outputs "0" to the encoder 289.

The comparing circuits 277 to 288 perform the above-described comparisons in parallel and output the comparison results to the encoder 289 in parallel. Thus, the encoder 289 receives the 12-bit data from the comparing circuits 277 to 288.

The encoder 289 receives the comparison results having 12 bits from the comparing circuits 277 to 288, and determines a bin number on the basis of the received 12-bit comparison results. More specifically, upon receiving comparison results "100000000000" from the comparing circuits 277 to 288, the encoder 289 determines that the bin number is "1", and upon receiving comparison results "000000100000" from the comparing circuits 277 to 288, the encoder 289 determines that the bin number is "7". Upon receiving other 12-bit comparison results, the encoder 289 also determines a bin number in the same manner.

The encoder 289 then outputs the determined bin number to the D latch circuit 26 as an S bin number.

As described above, since the data generating circuit 272 computes Y×MAX, the data generating circuit 273 computes Z×MAX, the data generating circuit 274 computes 20×(MAX−MIN), and the data generating circuit 275 computes 80×(MAX−MIN), each of the data generating circuits 272 to 275 can be realized by a simple circuit using an adder and a shifter.

Figure 18:
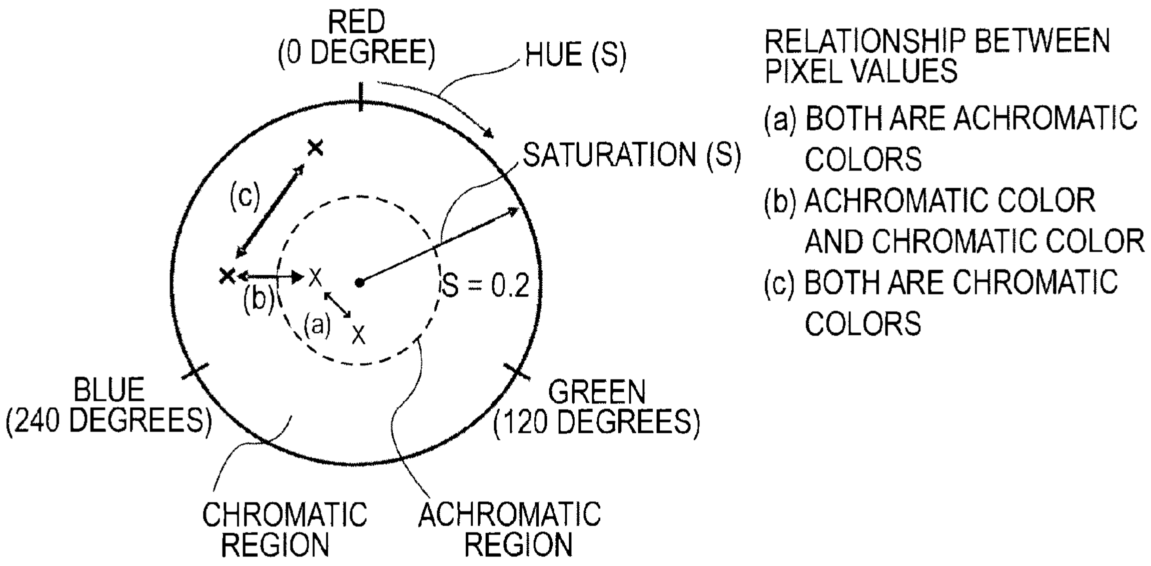
FIG. 18 is a diagram for describing a method for determining a connection weight.

A method for determining a connection weight will be described. FIG. 18 is a diagram for describing a method for determining a connection weight. Referring to FIG. 18, the outer circle represents a hue (Hue), and a saturation is expressed from the center toward the circumference.

Since it is empirically found out that approximately 0.2 is suitable as a threshold Sth for discriminating between a color region and a color that is close to achromatic color whose color tone is almost unidentifiable, 0.2 is used as the saturation boundary. The inner circle represents the boundary at which the saturation is 0.2. A region in which the saturation is lower than 0.2 has a color that is close to a substantially achromatic color, and a region in which the saturation is higher than 0.2 is treated as chromatic color. Further, × in the figure represents a pixel.

Saturations S1 and S2 are computed for two pixels, respectively, and the two computed saturations S1 and S2 are compared with the threshold Sth (=0.2).

When both of the two saturations S1 and S2 are smaller than or equal to the threshold Sth, it is determined that the two pixels belong to an achromatic region (in the case of FIG. 18(*a*)), and a connection weight between the two pixels is determined using expressions (4) and (5), on the basis of only RGB values.

When one of the two saturations S1 and S2 is smaller than or equal to the threshold Sth, it is determined that one of the two pixels belongs to an achromatic region and the other belongs to a chromatic region (in the case of FIG. 18(*b*)), and a connection weight between the two pixels is determined using the RGB values and the saturations (S).

In addition, when both of the two saturations S1 and S2 are greater than the threshold Sth, it is determined that both of the two pixels belong to a chromatic region (in the case of FIG. 18(*c*)), and a connection weight between the two pixels is determined using the RGB values and the hues (H).

As described above, in the present invention, the empirically determined threshold Sth (=0.2) is used to determine to which of an achromatic region and a chromatic region two pixels belong. Thus, it is possible to accurately determine to which region two pixels belong.

Also, since the threshold Sth (=0.2) is empirically determined in order to separate between a color region and a color that is closer to achromatic color whose color tone is almost unidentifiable by human vision, it is possible to accurately determine to which region two pixels belong in accordance with the actual discrimination performed by the human.

In the case shown in FIG. 18(*a*), even when a connection weight is calculated using hues (H) in the HSV color space, an improvement in the accuracy of region segmentation cannot be expected since hues are meaningless in achromatic regions. The use of luminance components (V) in the HSV color space is also possible. However, only RGB values are used in the region shown in FIG. 18(*a*) to determine a connection weight, since a simulation shows that the use of RGB values provides an improved accuracy.

In the case shown in FIG. 18(*b*), a leader cell is found in the person region in the sample image shown in FIG. 6, the region grows to the desk region, and the region expands from the achromatic region to the color region, thus resulting in segmentation error. Conversely, the region may grow from a color region to an achromatic region. When an influence of a shade that appears as a result of overlapping of the person and the desk causes the color to change gradually and no distinct edge appears at the region boundary, as in the sample images, it is difficult to perform segmentation by using only the RGB values.

In order to solve the problem, the boundary between the color region (the desk region) and the achromatic region (the person region) is detected by using, as a threshold, the saturation boundary of S=0.2 empirically determined using saturations (S).

Further, when two pixels belong to an achromatic region and a chromatic region, a boundary between the achromatic region and the chromatic region is determined using the saturations (S) and the connection weight between two pixels belonging to the boundary is set to be smaller than the value of the connection weight determined by the calculation of the RGB values. By doing so, the connection weight is determined so that a region growth from a chromatic region to an achromatic region or from an achromatic region to a chromatic region is suppressed. As a result, in the image segmentation, a region growth from a chromatic region to an achromatic region or from an achromatic region to a chromatic region is suppressed. Thus, with respect to an input image having a low contrast, it is possible to accurately segment the image.

In addition, in the case shown in FIG. 18(*c*), with the connection weight between pixels is determined based on the RGB values, when the luminance and the saturation change due to light reflection or the like, a difference in components between pixels becomes large and thus the connection weight becomes a small value. Thus, with the sample images shown in FIG. 7, it is difficult to extract identical regions together.

Accordingly, with attention being paid to the fact that the color tone itself does not change greatly even when the luminance and the saturation change, hue determination using hues (H) is incorporated. In the determination of the connection weight between pixels belonging to a chromatic region, two-pixel hue comparison is performed to determine whether or not the difference between the hues is within a threshold, i.e., whether or not the two pixels are in a range in which the hues thereof can be regarded as the same hue. When it is determined that they have the same hue and the connection weight determined from the RGB values is small (i.e., the difference is large in the RGB color space because of an influence of reflection or the like), a greater connection weight is given in a region growth-promoting direction. As a result, with respect to both pixels in chromatic regions belonging to similar hues, the regions can be easily grown, and regions in which the luminances and saturations change due to reflection or the like can be extracted together as one region.

Specific methods for determining connection weights for respective cases in FIGS. 18(*a*), (*b*), and (*c*) will be described.

In the case shown in FIG. 18(*a*), by using expressions (4) and (5) and using only RGB values, the connection weight is determined. When a circuit for computing the connection weight by using expressions (4) and (5) is implemented as a digital circuit, the connection weight in the present embodiment is determined by table mapping using a decoder, since a divider has a large circuit area and requires a plurality of clock cycles. Table 1 shows a conversion table when the connection weight is determined using only RGB values.

TABLE 1

| $\lvert I_{ij} - I_{kl}\rvert$ | CONNECTION WEIGHT |
|---|---|
| ① 1xxx_xxxx | 2 |
| ② 01xx_xxxx | 4 |
| ③ 001x_xxxx | 8 |
| ④ 0001_xxxx | 16 |
| ⑤ 0000_1xxx | 32 |
| ⑥ 0000_01xx | 64 |
| ⑦ 0000_001x | 128 |
| ⑧ 0000_000x | 256 |

The conversion table shown in FIG. 1 shows an association relationship between $|I_{i,j}-I_{k,l}|$, which is the absolute value of a difference between a luminance $I_{i,j}$ and a luminance $I_{k,l}$ computed using the RGB values of two pixels, i.e., a pixel of interest (i, j) and a neighborhood pixel (k, l), and the connection weight.

Therefore, in the present invention, in the case shown in FIG. 18(*a*), two luminances $I_{i,j}$ and $I_{k,l}$ are computed on the basis of the RGB values of two pixels (i, j) and (k, l), $|I_{i,j}-I_{k,l}|$ which is the absolute value of the difference between the computed two luminances $I_{i,j}$ and $I_{k,l}$ is computed, and the connection weight corresponding to the computed absolute value $|I_{i,j}-I_{k,l}|$ is extracted by referring to Table 1 to thereby determine the connection weight between the two pixels (i, j) and (k, l).

Next, in the case shown in FIG. 18(*b*), a connection weight is smaller than the connection weight obtained from the RGB color space by using the conversion table in Table 1 is given in order to suppress region expansion.

In this case, when two pixels are classified into two values in achromatic color and chromatic color by using the saturation boundary (S=0.2) as a threshold, connection weights are determined so that a connection weight between pixels in the vicinity of the saturation boundary and a connection weight between pixels that are completely away from the saturation boundary and that have completely different saturations are not treated according to the same criterion.

Figure 19:
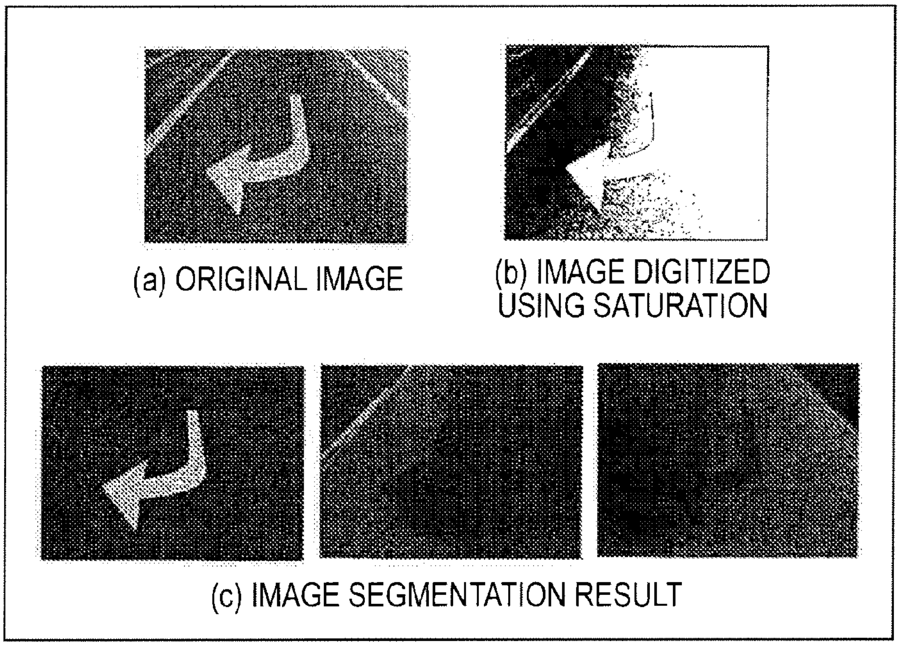
FIG. 19 is a figure showing an influence of reflection on pixel values.
Figure 20:
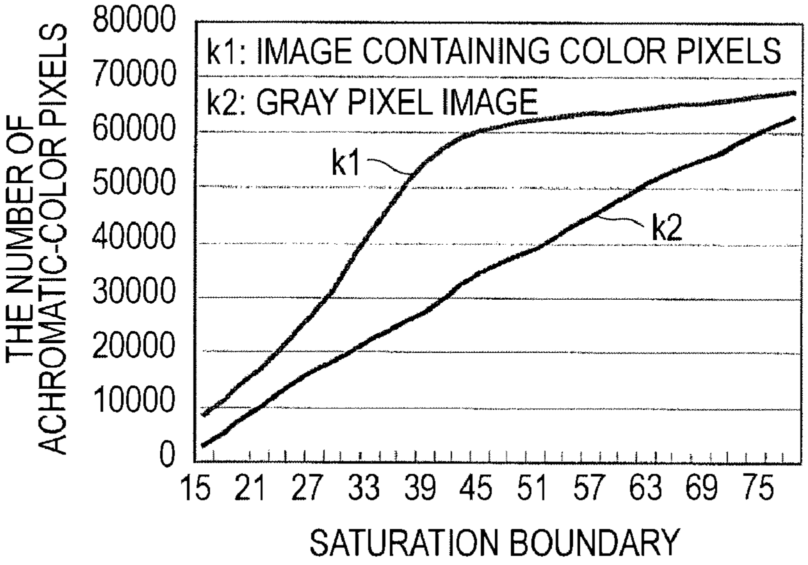
FIG. 20 is a figure showing a change in an achromatic-color pixel value when a saturation boundary is changed.

FIG. 19 is a figure showing an influence of reflection on pixel values. FIG. 20 is a figure showing a change in an achromatic-color pixel value when the saturation boundary is varied.

FIG. 19(*a*) shows an input image. FIG. 19(*b*) shows an image obtained by digitizing the road image shown in FIG. 19(*a*) into achromatic color (0) and chromatic color (1), with the saturation boundary (S=0.2) being used as a threshold. FIG. 19(*c*) shows results of image segmentation.

As can be understood from FIG. 19(*b*), with respect to the road portion in the image, when the empirically determined saturation boundary (S=0.2) is used as the threshold for discriminating between an achromatic region and a chromatic region, an identical region is separated and classified into an achromatic region and a chromatic region with the image center being the boundary. As a result, as shown in FIG. 19(*c*), the growth of the region of the road is suppressed with the saturation boundary being the border and the accuracy of the segmented images decreases compared to a case in which the RGB color space is used.

Referring to FIG. 20, a curve k1 indicates a change in the number of achromatic-color pixels with respect to an image in which a color region is contained, and a curve k2 shows a change in the number of achromatic-color pixels with respect to a gray image in which no color region is contained.

As can be understood from FIG. 20, for the image containing the color region, the number of achromatic-color pixels is saturated at a border where the saturation boundary is about 50 to 60 (S=0.2). On the other hand, for the gray image, the number of achromatic-color pixels continuously changes linearly.

As a result, if the connection weight between two pixels that sandwich the saturation boundary is sharply reduced to a region in which the region does not grow, the segmentation accuracy of the gray region decreases when the region cannot be successively segmented into achromatic regions and chromatic regions by the saturation boundary.

Accordingly, the reduction range of the connection weight is reduced with respect to both pixels that are close to the saturation boundary, and the reduction range of the connection weight is increased according to an increase in the distance from the saturation boundary. This can improve the segmentation accuracy of the gray region.

Table 2 shows a connection weight converting table in the case shown in FIG. 18(*b*).

TABLE 2

| | | $\lvert S_{ij} - S_{kl}\rvert$ | | | |
|---|---|---|---|---|---|
| $\lvert I_{ij} - I_{kl}\rvert$ | | if ≦6 | else if ≦9 | else if ≦12 | else |
| ① 1xxx_xxxx | CONNECTION WEIGHT | 2 | 2 | 2 | 2 |
| ② 01xx_xxxx | | 2 | 2 | 2 | 2 |
| ③ 001x_xxxx | | 4 | 4 | 4 | 2 |
| ④ 0001_xxxx | | 8 | 8 | 4 | 2 |
| ⑤ 0000_1xxx | | 16 | 8 | 4 | 2 |
| ⑥ 0000_01xx | | 16 | 8 | 4 | 2 |
| ⑦ 0000_001x | | 16 | 8 | 4 | 2 |
| ⑧ 0000_000x | | 16 | 8 | 4 | 2 |

As can be understood from Table 2, when the absolute value is $|I_{i,j}-I_{k,l}|$ is 001x_xxxx, 0000_1xxxx, 0000_01xx, 0000_001x, or 0000_000x, the connection weight is determined so that the reduction range from the connection weight (refer to Table 1) determined using only RGB values is increased according to an increase in the saturation difference $|S_{i,j}-S_{k,l}|$.

Lastly, a specific method for determining a connection weight in the case shown in FIG. 18(*c*) will be described. For a color image, it has been known that, when there is no influence of reflection or the like, determination of a connection weight in the RGB color space can provide a region segmentation result with high accuracy. Thus, it is preferable that the connection weight be optimized using the HSV color space with respect to only a connection weight between the pixels affected by reflection.

Figure 21:
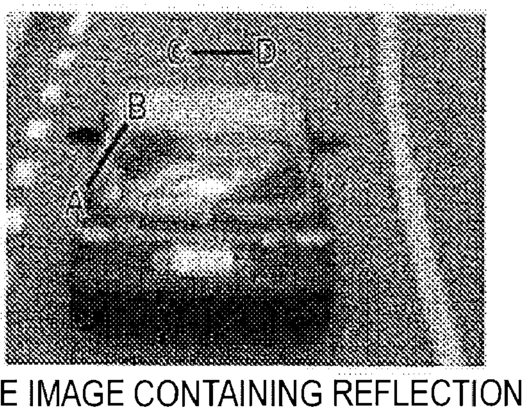
FIG. 21 is a figure showing an influence due to diffused reflection of each of R, G, and B components.
Figure 21:
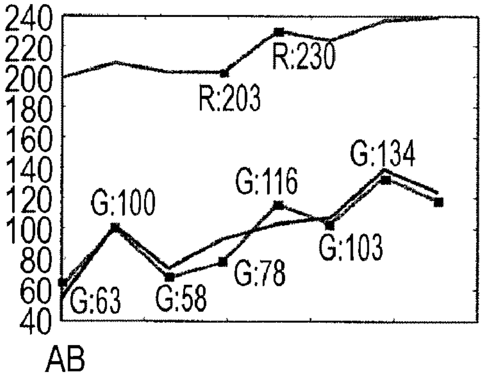
Figure 21:
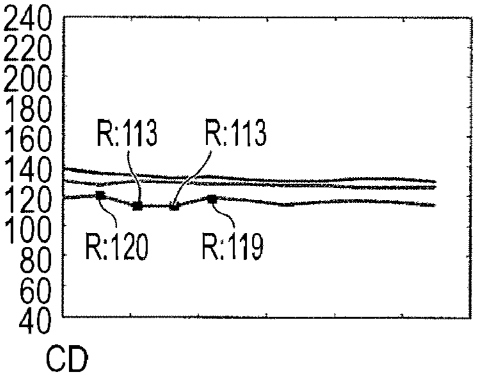

Accordingly, to what degree the individual components of R, G, and B are changed between contiguous pixels by an influence of diffused reflection was examined using sample images. FIG. 21 is a figure showing an influence due to diffused reflection of the individual components of R, G, and B.

FIG. 21(*a*) shows a sample image used for evaluation, FIG. 21(*b*) shows changes in the R, G, and B values of pixels on line segment A-B shown in FIG. 21(*a*), and FIG. 21(*c*) shows changes in the R, G, and B values of pixels on line segment C-D shown in FIG. 21(*a*). That is, FIG. 21(*b*) shows changes in the pixel values of a vehicle body region affected by light reflection, and FIG. 21(*c*) shows changes in the pixel values of a road region unaffected by light reflection.

Referring to FIG. 21, the body region is large in change in pixel values between contiguous pixels, compared to the road region. From the sample image having the reflection region, it was found out that the amount of inter-pixel change due to light reflection is concentrated between 30 and 100. Thus, it is determined that a region in which the difference between the pixel values is very small or conversely a region in which the difference between the pixel values is very large is not affected by light reflection.

Accordingly, in the present invention, the connection weight optimization utilizing the hue (H) evaluation results is limited to 01xx_xxxx, 001x_xxxx, and 0001_xxxx shown in Table 1, to thereby make it possible to improve the accuracy by using the hues (H) while maintaining the accuracy of color-region segmentation using RGB values.

Next, to what value the connection weight for 01xx_xxxx, 001x_xxxx, and 0001_xxxx shown in Table 1 is increased on the basis of difference between the hue values of two pixels is discussed. When the range of hues (H) is excessively increased, the region grows until it turns into a different color. For example, when the pixel values of red and orange whose hues are close to each other are treated as the same hue, it has become difficult to separate two regions.

Conversely, when the range of hues (H) is excessively reduced, the circuit area increases since calculation for converting RGB values into hues (H) requires division.

Accordingly, as a result of simulation considering both of the mounting area and the segmentation accuracy, it was found out that colors whose hues are close to each other can also be subjected to segmentation when the minimum unit of the hue (H) is set to 4 degrees.

Figure 22:
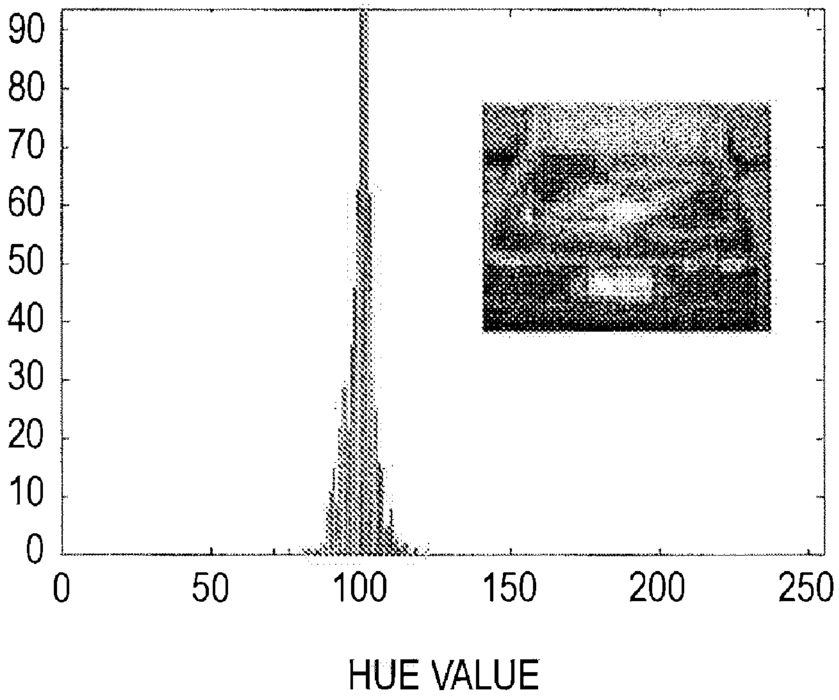
FIG. 22 is a graph showing a histogram of hue values of a red vehicle body.

FIG. 22 is a figure showing a histogram of hue values of the body of a red vehicle. Also, FIG. 23 is a figure showing a histogram of hue values of the body of a blue vehicle.

Figure 23:
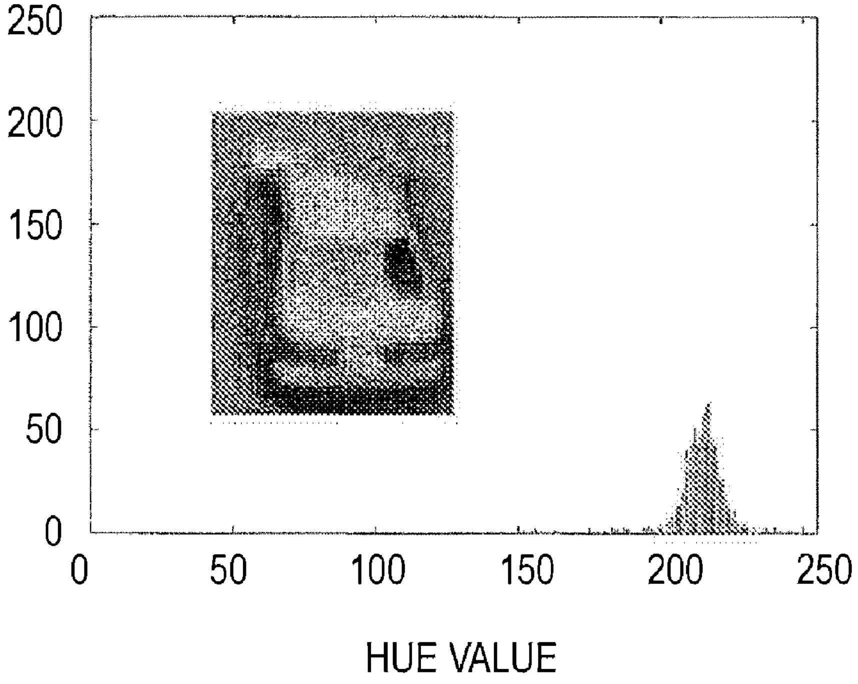
FIG. 23 is a graph showing a histogram of hue values of a blue vehicle body.

Referring to FIGS. 22 and 23, most pixels are intensively extracted in the range of ±10 degrees with the center being the histogram mountain. Also, the amount of change in the difference of the hue values between pixels is very small, i.e., within about 10 degrees, in an identical region (an identical color).

Thus, considering the above-described empirical results, three determination conditions, i.e., 4 degrees or less, 5 to 8 degrees, and other degrees, are provided with respect to the difference $|H_{ij}-H_{kl}|$ in the hue values between two pixels, and the connection weight conversion table in the case shown in FIG. 18(*c*) is determined as shown in Table 3.

TABLE 3

| $\|I_{ij} - I_{kl}\|$ | $\|H_{ij} - H_{kl}\|$ | CONNECTION WEIGHT |
|---|---|---|
| ① 1xxx_xxxx | | 2 |
| ② 01xx_xxxx | if ≦4 | 16 |
| | else | 4 |
| ③ 001x_xxxx | if ≦4 | 32 |
| | if ≦8 | 16 |
| | else | 8 |

TABLE 3-continued

| $\|I_{ij} - I_{kl}\|$ | $\|H_{ij} - H_{kl}\|$ | CONNECTION WEIGHT |
|---|---|---|
| ④ 0001_xxxx | if ≦4 | 32 |
| | else | 16 |
| ⑤ 0000_1xxx | | 32 |
| ⑥ 0000_01xx | | 64 |
| ⑦ 0000_001x | | 128 |
| ⑧ 0000_000x | | 256 |

In this manner, each time the hue difference between two pixels changes by 4 degrees, the connection weight between the two pixels is varied. Further, a greater connection weight is given according a decrease in the hue difference.

Figure 24:
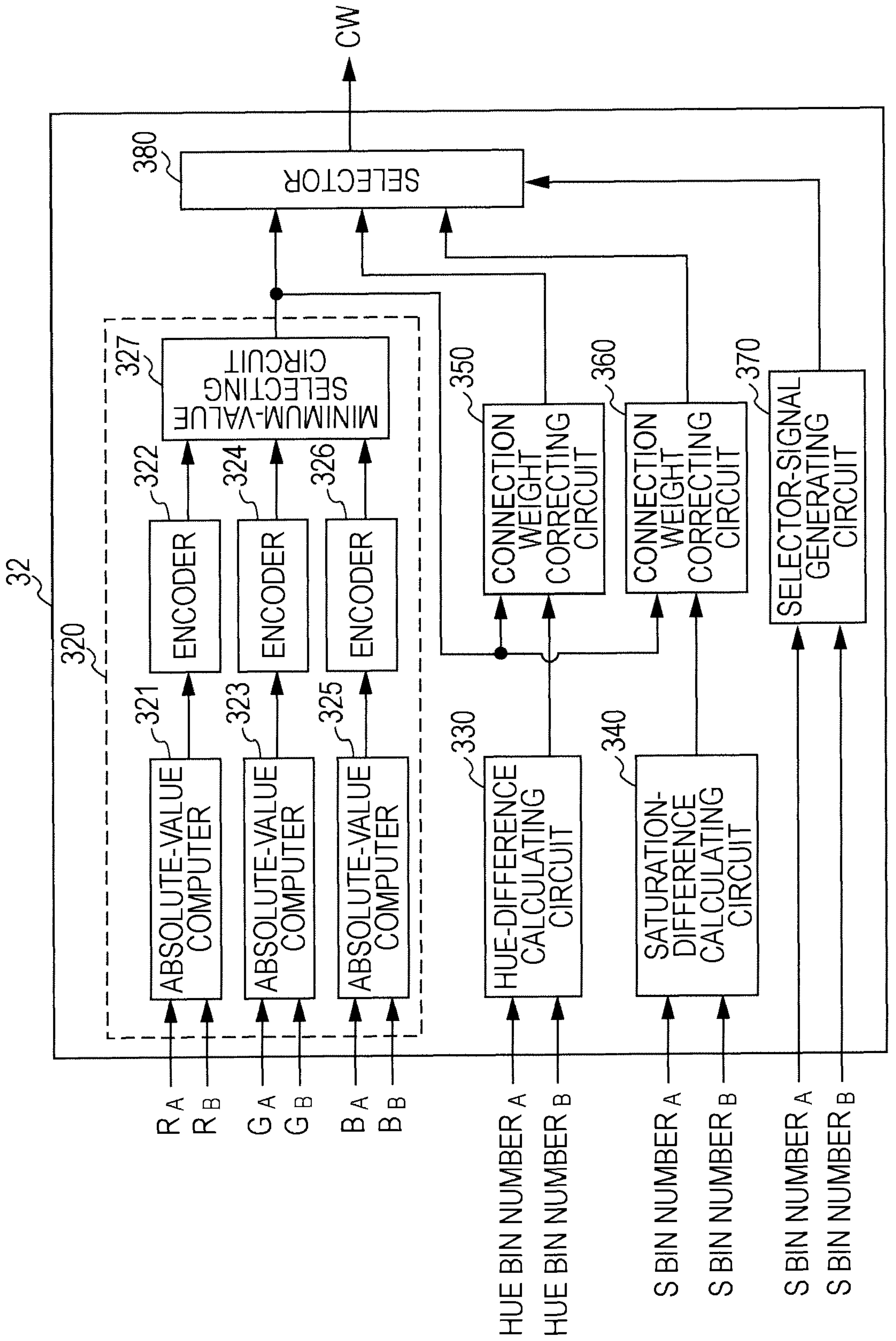
FIG. 24 is a configuration diagram of a weight calculating unit shown in FIG. 2.

FIG. 24 is a schematic diagram of the weight calculating unit 32 shown in FIG. 2. Referring to FIG. 24, the weight calculating unit 32 includes a connection weight computing circuit 320, a hue-difference calculating circuit 330, a saturation-difference calculating circuit 340, connection weight correcting circuits 350 and 360, a selector-signal generating circuit 370, and a selector 380.

The connection weight computing circuit 320 computes a connection weight between two pixels by using Table 1, on the basis of two RGB values received from the D latch circuit 22 and the FIFO circuit 23, and outputs the computed connection weight to the connection weight correcting circuits 350 and 360 and the selector 380.

The connection weight computing circuit 320 includes absolute-value computers 321, 323, and 325, encoders 322, 324, and 326, and a minimum-value selecting circuit 327.

The absolute-value computer 321 computes luminances $I_A(R)$ and $I_B(R)$ on the basis of two R values $R_A$ and $R_B$ received from the D latch circuit 22 and the FIFO circuit 23, and computes $|I_A(R)-I_B(R)|$ which is the absolute value of a difference between the computed luminances $I_A(R)$ and $I_B(R)$. The absolute-value computer 321 then outputs the computed absolute value $|I_A(R)-I_B(R)|$ to the encoder 322.

The encoder 322 holds Table 1. Upon receiving the absolute value $|I_A(R)-I_B(R)|$ from the absolute-value computer 321, the encoder 322 refers to Table 1 to extract a connection weight $W_{A,B}(R)$ corresponding to the absolute value $|I_A(R)-I_B(R)|$ and outputs the extracted connection weight $W_{A,B}(R)$ to the minimum-value selecting circuit 327.

The absolute-value computer 323 computes luminances $I_A(G)$ and $I_B(G)$ on the basis of two G values $G_A$ and $G_B$ received from the D latch circuit 22 and the FIFO circuit 23, and computes $|I_A(G)-I_B(G)|$ which is the absolute value of a difference between the computed luminances $I_A(G)$ and $I_B(G)$. The absolute-value computer 323 then outputs the computed absolute value $|I_A(G)-I_B(G)|$ to the encoder 324.

The encoder 324 holds Table 1. Upon receiving the absolute value $|I_A(G)-I_B(G)|$ from the absolute-value computer 323, the encoder 324 refers to Table 1 to extract a connection weight $W_{A,B}(G)$ corresponding to the absolute value $|I_A(G)-I_B(G)|$ and outputs the extracted connection weight $W_{A,B}(G)$ to the minimum-value selecting circuit 327.

The absolute-value computer 325 computes luminances $I_A(B)$ and $I_B(B)$ on the basis of two B values $B_A$ and $B_B$ received from the D latch circuit 22 and the FIFO circuit 23, and computes $|I_A(B)-I_B(B)|$ which is the absolute value of a difference between the computed luminances $I_A(B)$ and $I_B(B)$. The absolute-value computer 325 then outputs the computed absolute value $|I_A(B)-I_B(B)|$ to the encoder 326.

The encoder 326 holds Table 1. Upon receiving the absolute value $|I_A(B)-I_B(B)|$ from the absolute-value computer 325, the encoder 326 refers to Table 1 to extract a connection weight $W_{A,B}(B)$ corresponding to the absolute value $|I_A(B)-I_B(B)|$ and outputs the extracted connection weight $W_{A,B}(B)$ to the minimum-value selecting circuit 327.

The minimum-value selecting circuit 327 receives the connection weights $W_{A,B}(R)$, $W_{A,B}(G)$, and $W_{A,B}(B)$ from the encoders 322, 324, and 326, respectively, and selects a smallest connection weight $W_{A,B}$ from the received three connection weights $W_{A,B}(R)$, $W_{A,B}(G)$, and $W_{A,B}(B)$. The minimum-value selecting circuit 327 then outputs the selected connection weight $W_{A,B}$ to the connection weight correcting circuits 350 and 360 and the selector 380.

The hue-difference calculating circuit 330 holds the hue-bin number assignment diagram shown in FIG. 14 and receives a hue bin number $_A$ and a hue bin number $_B$ from the D latch circuit 27 and the FIFO circuit 28, respectively. The hue-difference calculating circuit 330 then refers to the hue-bin number assignment diagram shown in FIG. 14 to detect hue values $H_A$ and $H_B$ corresponding to the received hue bin number $_A$ and hue bin number $_B$. Then, the hue-difference calculating circuit 330 computes a hue difference $|H_A-H_B|$ and outputs the computed hue difference $|H_A-H_B|$ to the connection weight correcting circuit 350.

The saturation-difference calculating circuit 340 holds the S-bin-number assignment diagram shown in FIG. 16 and receives an S bin number $_A$ and an S bin number $_B$ from the D latch circuit 27 and the FIFO circuit 28, respectively. The saturation-difference calculating circuit 340 then refers to the S-bin-number assignment diagram shown in FIG. 16 to detect S values $S_A$ and $S_B$ corresponding to the received S bin number $_A$ and S bin number $_B$. Then, the saturation-difference calculating circuit 340 computes a saturation difference $|S_A-S_B|$ and outputs the computed saturation difference $|S_A-S_B|$ to the connection weight correcting circuit 360.

The connection weight correcting circuit 350 holds Table 3, receives the connection weight $W_{A,B}$ from the connection weight computing circuit 320, and receives the hue difference $|H_A-H_B|$ from the hue-difference calculating circuit 330. The connection weight correcting circuit 350 then refers to Table 3 to extract an absolute value $|I_{ij}-I_{kl}|$ that matches the connection weight $W_{A,B}$.

Thereafter, when the extracted absolute value $|I_{ij}-I_{kl}|$ is one of 1xxx_xxxx, 0000__1xxx, 0000__01xx, 0000__001x, and 0000__000x shown in Table 3, the connection weight correcting circuit 350 extracts a connection weight $W_{A,B}$_H corresponding to 1xxx_xxxx, 0000__1xxx, 0000__01xx, 0000__001x, or 0000__000x from Table 3 and outputs the extracted connection weight $W_{A,B}$_H to the selector 380.

Also, when the extracted absolute value $|_{ij}-I_{kl}|$ is 01xx_xxxx shown in Table 3, the connection weight correcting circuit 350 determines whether or not the hue difference $|H_A-H_B|$ is "4" or less. When the hue difference $|H_A-H_B|$ is "4" or less, the connection weight correcting circuit 350 extracts the connection weight $W_{A,B}$_H, which is 16, from Table 3, and outputs the extracted connection weight $W_{A,B}$_H (=16) to the selector 380. On the other hand, when the hue difference $|H_A-H_B|$ is not "4" or less, the connection weight correcting circuit 350 extracts the connection weight $W_{A,B}$_H, which is 4, from Table 3, and outputs the extracted connection weight $W_{A,B}$_H (=4) to the selector 380.

In addition, when the extracted absolute value $|I_{ij}-I_{kl}|$ is 001x_xxxx shown in Table 3, the connection weight correcting circuit 350 determines whether or not the hue difference $|H_A-H_B|$ is "4" or less. When the hue difference $|H_A-H_B|$ is "4" or less, the connection weight correcting circuit 350 extracts the connection weight $W_{A,B}$_H, which is 32, from Table 3, and outputs the extracted connection weight $W_{A,B}$_H (=32) to the selector 380. On the other hand, when the hue difference $|H_A-H_B|$ is not "4" or less, the connection weight correcting circuit 350 further determines whether or not the hue difference $|H_A-H_B|$ is "8" or less. When the hue difference $|H_A-H_B|$ is "8" or less, the connection weight correcting circuit 350 extracts the connection weight $W_{A,B}$_H, which is 16, from Table 3, and outputs the extracted connection weight $W_{A,B}$_H (=16) to the selector 380. On the other hand, when the hue difference $|H_A-H_B|$ is not "8" or less, the connection weight correcting circuit 350 extracts the connection weight $W_{A,B}$_H, which is 8, from Table 3, and outputs the extracted connection weight $W_{A,B}$_H (=8) to the selector 380.

In addition, when the extracted absolute value $|I_{ij}-I_{kl}|$ is 0001_xxxx shown in Table 3, the connection weight correcting circuit 350 determines whether or not the hue difference $|H_A-H_B|$ is "4" or less. When the hue difference $|H_A-H_B|$ is "4" or less, the connection weight correcting circuit 350 extracts the connection weight $W_{A,B}$_H, which is 32, from Table 3, and outputs the extracted connection weight $W_{A,B}$_H (=32) to the selector 380. On the other hand, when the hue difference $|H_A-H_B|$ is not "4" or less, the connection weight correcting circuit 350 extracts the connection weight $W_{A,B}$_H, which is 16, from Table 3, and outputs the extracted connection weight $W_{A,B}$_H (=16) to the selector 380.

The connection weight correcting circuit 360 holds Table 2, receives the connection weight $W_{A,B}$ from the connection weight computing circuit 320, and receives the hue difference $|S_A-S_B|$ from the hue-difference calculating circuit 340. The connection weight correcting circuit 360 then refers to Table 2 to extract an absolute value $|I_{ij}-I_{kl}|$ that matches the connection weight $W_{A,B}$.

Also, the connection weight correcting circuit 360 determines whether or not the saturation difference $|S_A-S_B|$ is "6" or less. When the saturation difference $|S_A-S_B|$ is "6" or less, the connection weight correcting circuit 360 extracts, from Table 2, a connection weight $W_{A,B}$_S corresponding to the absolute value $|I_{ij}-I_{kl}|$ that matches the connection weight $W_{A,B}$ and corresponding to "if≦6", and outputs the extracted connection weight $W_{A,B}$_S to the selector 380.

On the other hand, when the saturation difference $|S_A-S_B|$ is not "6" or less, the connection weight correcting circuit 360 further determines whether or not the saturation difference $|S_A-S_B|$ is "9" or less. When the saturation difference $|S_A-S_B|$ is "9" or less, the connection weight correcting circuit 360 extracts, from Table 2, a connection weight $W_{A,B}$_S corresponding to the absolute value $|I_{ij}-I_{kl}|$ that matches the connection weight $W_{A,B}$ and corresponding to "else if≦9", and outputs the extracted connection weight $W_{A,B}$_S to the selector 380.

On the other hand, when the saturation difference $|S_A-S_B|$ is not "9" or less, the connection weight correcting circuit 360 further determines whether or not the saturation difference $|S_A-S_B|$ is "12" or less. When the saturation difference $|S_A-S_B|$ is "12" or less, the connection weight correcting circuit 360 extracts, from Table 2, a connection weight $W_{A,B}$_S corresponding to the absolute value $|I_1-I_{kl}|$ that matches the connection weight $W_{A,B}$ and corresponding to "else if≦12", and outputs the extracted connection weight $W_{A,B}$_H to the selector 380.

On the other hand, when the saturation difference $|S_A-S_B|$ is not "12" or less, the connection weight correcting circuit 360 extracts, from Table 2, a connection weight $W_{A,B}$_S corresponding to the absolute value $|I_{ij}-I_{kl}|$ that matches the connection weight $W_{A,B}$ and corresponding to "else", and outputs the extracted connection weight $W_{A,B}$_S to the selector 380.

The selector-signal generating circuit 370 holds the threshold Sth (=0.2) and the S-bin-number assignment diagram shown in FIG. 16 and receives the S bin number $_A$ and the S bin number $_B$ from the D latch circuit 27 and the FIFO circuit 28, respectively. The selector-signal generating circuit 370 then refers to the S-bin-number assignment diagram shown in FIG. 16 to detect S values $S_A$ and $S_B$ corresponding to the received S bin number $_A$ and S bin number $_B$.

Then, the selector-signal generating circuit 370 compares the detected two S values $S_A$ and $S_B$ with the threshold Sth. When both of the two S values $S_A$ and $S_B$ are smaller than or equal to the threshold Sth, the selector-signal generating circuit 370 generates a selector signal SEL_RGB for selecting the connection weight $W_{A,B}$ received from the connection weight computing circuit 320 and outputs the generated selector signal SEL_RGB to the selector 380.

Also, when one of the two S values $S_A$ and $S_B$ is smaller than or equal to the threshold Sth, the selector-signal generating circuit 370 generates a selector signal SEL_S for selecting the connection weight $W_{A,B}$_S received from the connection weight correcting circuit 360 and outputs the generated selector signal SEL_S to the selector 380.

In addition, when both of the two S values $S_A$ and $S_B$ are greater than the threshold Sth, the selector-signal generating circuit 370 generates a selector signal SEL_H for selecting the connection weight $W_{A,B}$_S received from the connection weight correcting circuit 350 and outputs the generated selector signal SEL_H to the selector 380.

The selector 380 receives the connection weight $W_{A,B}$ from the connection weight computing circuit 320, and receives the connection weights $W_{A,B}$_H and $W_{A,B}$_S from the connection weight correcting circuits 350 and 360, respectively. Then, upon receiving the selector signal SEL_RGB from the selector-signal generating circuit 370, the selector 380 selects the connection weight $W_{A,B}$ and outputs the selected connection weight $W_{A,B}$ as a connection weight CW. Also, upon receiving the selector signal SEL_S from the selector-signal generating circuit 370, the selector 380 selects the connection weight $W_{A,B}$_S and outputs the selected connection weight $W_{A,B}$_S as a connection weight CW. In addition, upon receiving the selector signal SEL_H from the selector-signal generating circuit 370, the selector 380 selects the connection weight $W_{A,B}$_H and outputs the selected connection weight $W_{A,B}$_H as a connection weight CW.

The weight calculating unit 33 shown in FIG. 2 has the same configuration as the weight calculating unit 32 shown in FIG. 24. On the basis of the RGB values $RGB_A$ and $RGB_B$ received from the D latch circuits 21 and 24, the hue bin number $_A$, the hue bin number $_B$, the S bin number $_A$, and the S bin number $_B$ received from the D latch circuits 26 and 29, the weight calculating unit 33 computes connection weights $W_{A,B}$, $W_{A,B}$_H, and $W_{A,B}$_S by using the same method as in the weight calculating unit 32, selects one of the computed connection weights $W_{A,B}$, $W_{A,B}$_H, and $W_{A,B}$_S, and outputs the selected connection weight as a connection weight CW.

The weight calculating unit 34 shown in FIG. 2 has the same configuration as the weight calculating unit 32 shown in FIG. 24. On the basis of the RGB values $RGB_A$ received from the D latch circuits 24, the hue bin number $_A$ and the S bin number $_A$ received from the D latch circuit 29, and the RGB value $RGB_B$, the hue bin number $_B$, and the S bin number $_B$ received from the selector 30, the weight calculating unit 34 computes connection weights $W_{A,B}$, $W_{A,B}$_H, and $W_{A,B}$_S by using the same method as in the weight calculating unit 32, selects one of the computed connection weights $W_{A,B}$, $W_{A,B}$_H, and $W_{A,B}$_S, and outputs the selected connection weight as a connection weight CW.

In addition, the weight calculating unit 35 shown in FIG. 2 has the same configuration as the weight calculating unit 32 shown in FIG. 24. On the basis of the RGB value $RGB_A$ received from the D latch circuits 21, the hue bin number $_A$ and the S bin number $_A$ received from the D latch circuit 26, and the RGB value $RGB_B$, the hue bin number $_B$, and the S bin number $_B$ received from the selector 31, the weight calculating unit 35 computes connection weights $W_{A,B}$, $W_{A,B}$_H, and $W_{A,B}$_S by using the same method as in the weight calculating unit 32, selects one of the computed connection weights $W_{A,B}$, $W_{A,B}$_H, and $W_{A,B}$_S, and outputs the selected connection weight as a connection weight CW.

Figure 25:
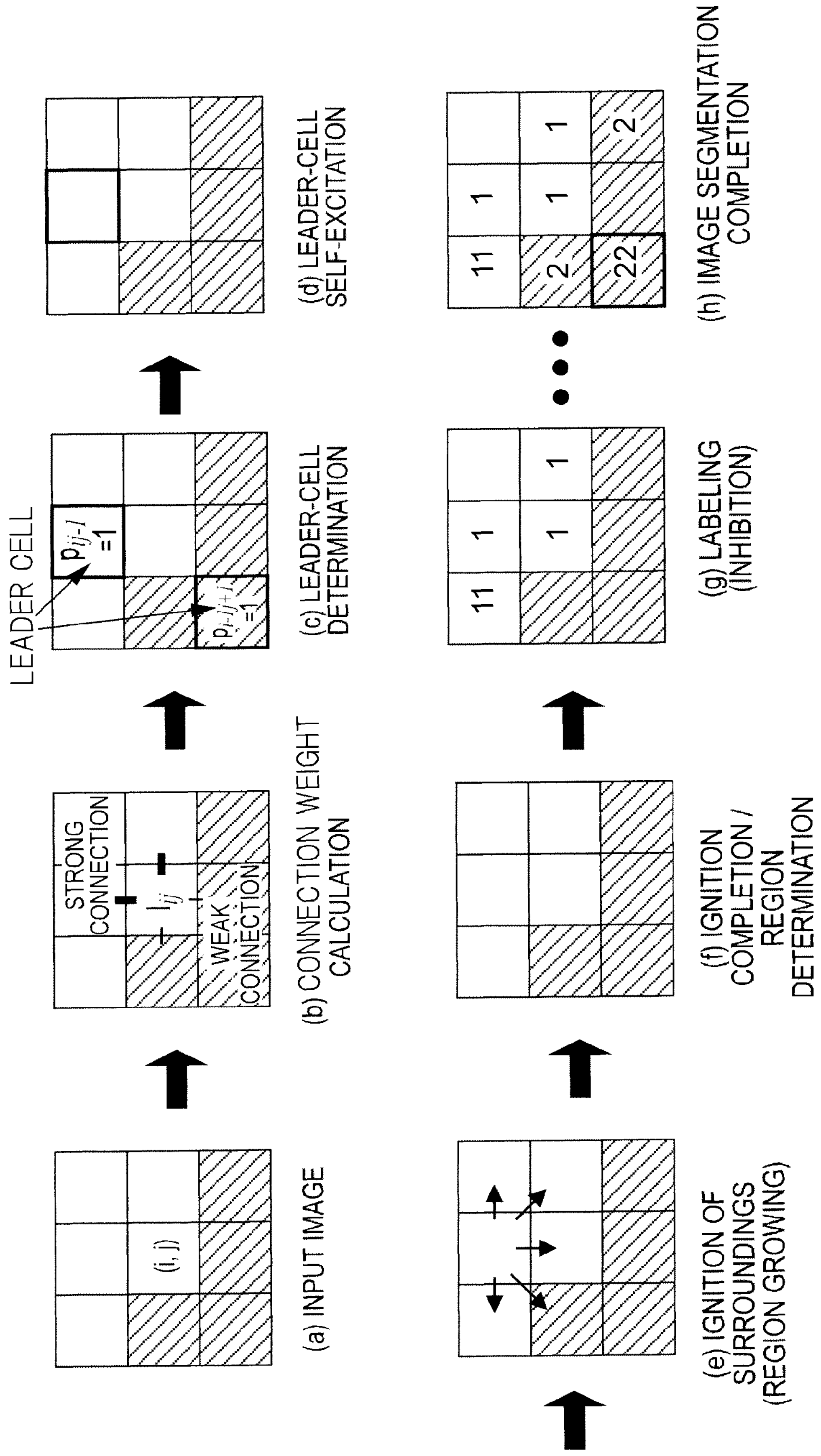
FIG. 25 is a figure for describing an image segmentation method.

Image segmentation method in the image segmenting circuit 3 will be described. FIG. 25 is a figure for describing the image segmentation method. The image segmenting circuit 3 segments one frame into images of subjects by using a region-growing image segmentation method.

In this region-growing image segmentation method, behavior of an oscillator relative to each pixel in an oscillator network in LEGION model (D. L. Wang, and D. Terman, "Image segmentation based on oscillator correlation," Neural Computation, Volume 9(4), pp. 805-836 (1997).) is treated in four states, namely, self-excitation (Self-Excitation), self-excitable (Self-Excitable), excitation (Excitation), and inhibition (Inhibition). The region-growing image segmentation method includes four steps of initialization, self-excitation, excitation, and inhibition.

The image segmenting circuit 3 receives an input image having a 3×3 configuration shown in FIG. 25(*a*). The image segmenting circuit 3 then receives, from the connection weight determining circuit 2, eight inter-pixel connection weights CW1 to CW8 for nine pixels constituting the input image. The image segmenting circuit 3 holds the received eight connection weights CW1 to CW8 in a memory in association with between the corresponding pixels. FIG. 25(*b*) illustrates eight connection weights between a pixel (2, 2) and surrounding pixels.

Thus, the image segmenting circuit 3 reads the eight connection weights CW1 to CW8 held in the memory and computes a sum SUM(CW) of the read eight connection weights CW1 to CW8. The image segmenting circuit 3 then determines whether or not the computed sum SUM(CW) is greater than the threshold $\phi_P$ for determining a leader cell. In this application, SUM indicates summation represented by a sigma symbol in mathematics.

Upon determining that the sum SUM(CW) is greater than a threshold $\phi_P$, the image segmenting circuit 3 sets, as the leader cell, a pixel that was at the center of connection weight calculation and sets a leader cell flag $p_{ij}=1$. On the other hand, upon determining that the sum SUM(CW) is smaller than or equal to the threshold $\phi_P$, the image segmenting circuit 3 sets a leader cell flag $p_{ij}=0$ without setting, as the leader cell, a pixel that was at the center of connection weight calculation.

The image segmenting circuit 3 executes this processing by setting each of the nine pixels of the input image to a pixel that is at the center of connection weight calculation, to determine the leader cell (see FIG. 25(*c*)).

Thereafter, the image segmenting circuit 3 causes self-excitation of one of the leader cells (an excitation flag $x_{ij}=1$) (see FIG. 25(*d*)). When a cell (k, l)∈$N_{ij}$ corresponding to eight pixels adjacent to each cell (i, j) is excited, the image segmenting circuit 3 computes a sum SUM($_{k,\ l)\in Nij\hat{}\times kl=1}W_{ij;kl}$ of the connection weight between the cell (i, j) and the cell (k,l). When the computed sum $SUM_{(k,\ l)\in Nij\hat{}\times kl=1}W_{ij;kl}$ is greater than a threshold $\phi_Z$ and the cell (i, j) does not belong to any segmented region (a label flag $l_{ij}=0$), the image segmenting circuit 3 causes self excitation ($x_{ij}=1$) (ignition/region growing) (see FIG. 25(*e*)). This ignition processing causes the region to expand, and when a cell that is newly excited does not exist as shown in FIG. 25(*f*), the segmentation of one region is finished.

Thereafter, in order to store the segmented regions, the image segmenting circuit 3 writes label numbers for segmented-region identification to cells that are being excited, as shown in FIG. 25(*g*), sets a label flag ($l_{ij}$=1) indicating that the excited cells are already segmented cells, and performs inhibition processing ($x_{ij}$=0, $p_{ij}$=0).

When the inhibition processing is finished, the image segmenting circuit 3 returns to the self-excitation processing for segmenting a next region. The image segmenting circuit 3 then repeatedly executes the above-described processing until no more leader cell exists, to segment each region. After all leader cells are excited, the image segmenting circuit 3 attaches labels to all regions and finishes the segmentation of one-frame image (see FIG. 25(*h*)).

Figure 26:
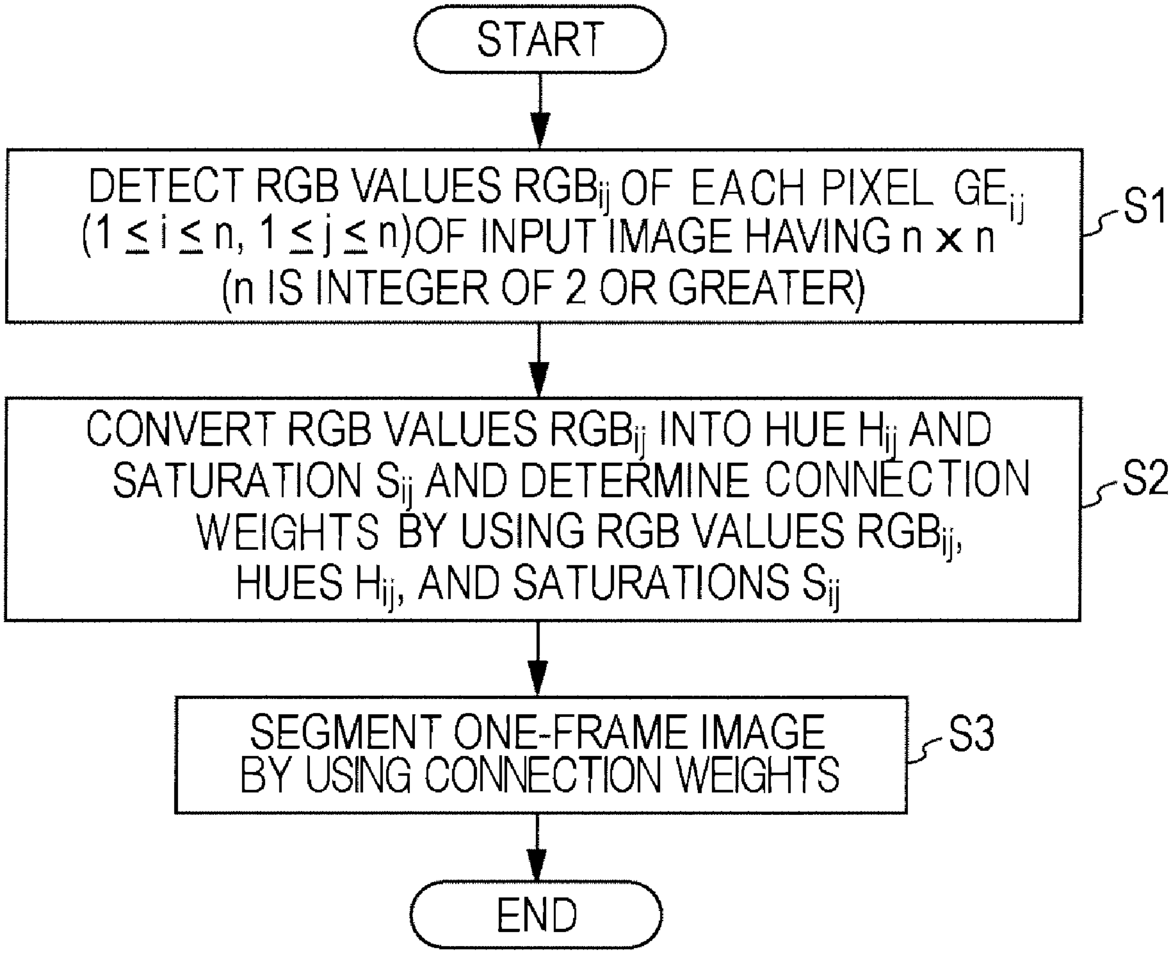
FIG. 26 is a flowchart for describing an image segmentation method according to the present invention.

FIG. 26 is a flowchart for describing the image segmentation method according to the present invention. Referring to FIG. 26, when a series of operations is started, the pixel-value detecting circuit 1 detects RGB values $RGB_{ij}$ (1≦i≦n, 1≦j≦n) of each pixel $GE_{ij}$ (1≦i≦n, 1≦j≦n) of an input image having n×n (n is an integer of 2 or greater) (step S1) and outputs the detected each-pixel RGB values $RGB_{ij}$ to the connection weight determining circuit 2.

The connection weight determining circuit 2 receives the RGB values $RGB_{ij}$ (1≦i≦n, 1≦j≦n) of each pixel $GE_{ij}$ (1≦i≦n, 1≦j≦n) from the pixel-value detecting circuit 1, converts the received RGB values $RGB_{ij}$ (1≦i≦n, 1≦j≦n) of each pixel $GE_{ij}$ (1≦i≦n, 1≦j≦n) into a hue $H_{ij}$ (1≦i≦n, 1≦j≦n) and a saturation $S_{ij}$ (1≦i≦n, 1≦j≦n) by using the above described method. On the basis of the RGB values $RGB_{ij}$ (1≦i≦n, 1≦j≦n), the hues $H_{ij}$ (1≦i≦n, 1≦j≦n), and the saturations $S_{ij}$ (1≦i≦n, 1≦j≦n), the connection weight determining circuit 2 determines connection weights $W_{ij;kl}$ (1≦i≦n, 1≦j≦n, 1≦k≦n, 1≦l≦n) between pixels (step S2). The connection weight determining circuit 2 then outputs the determined inter-pixel connection weights $W_{ij;kl}$ (1≦i≦n, 1≦j≦n, 1≦k≦n, 1≦l≦n) to the image segmenting circuit 3.

The image segmenting circuit 3 externally receives the input image and receives the inter-pixel connection weights $W_{ij;kl}$ (1≦i≦n, 1≦j≦n, 1≦k≦n, 1≦l≦n) from the connection weight determining circuit 2. Then, by using the received inter-pixel connection weights $W_{ij;kl}$ (1≦i≦n, 1≦j≦n, 1≦k≦n, 1≦l≦n the image segmenting circuit 3 then segments one-frame image (step S3). Then series of operations then ends.

Figure 27:
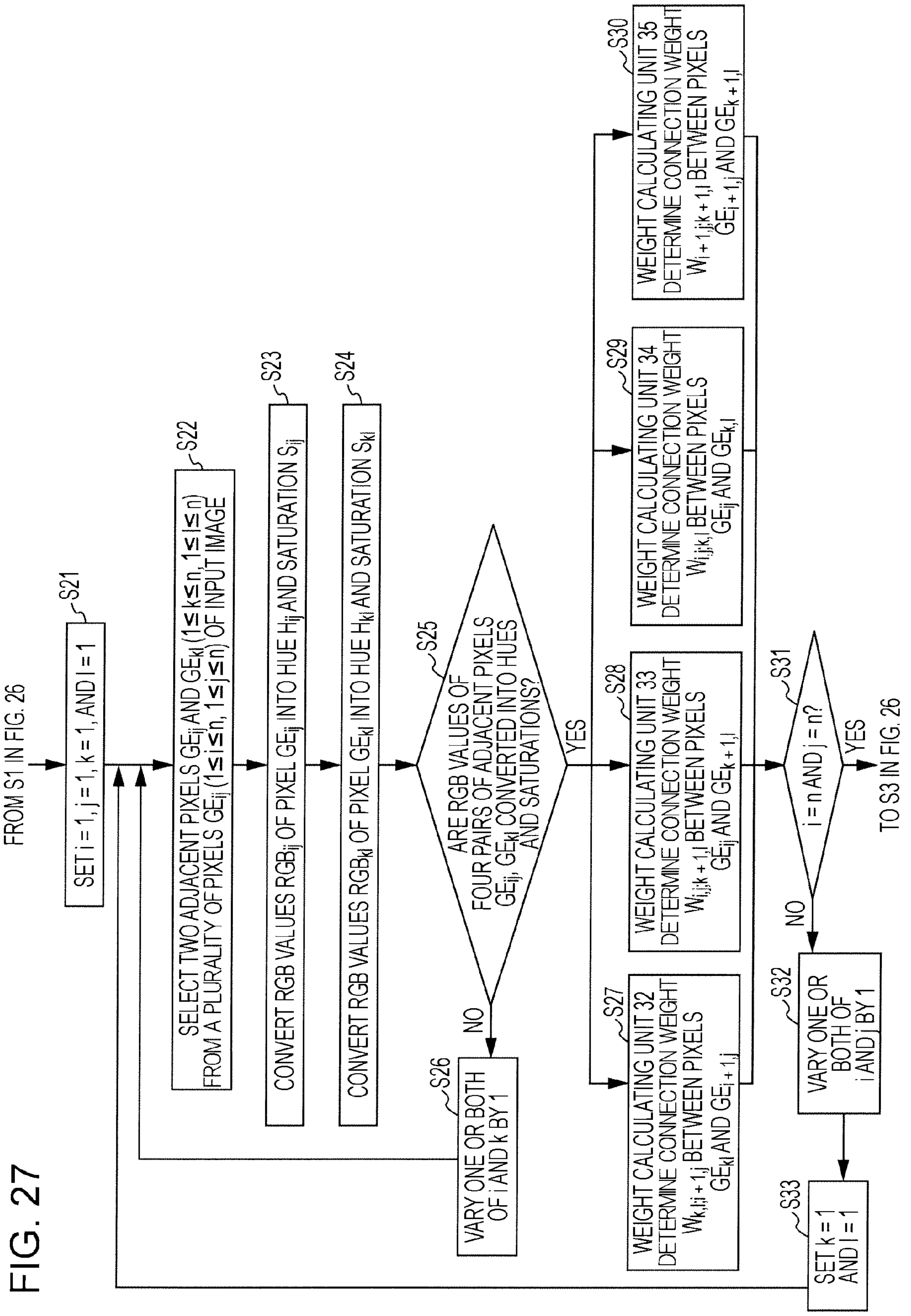
FIG. 27 is a flowchart for describing a detailed operation of step S2 shown in FIG. 26.

FIG. 27 is a flowchart for describing a detailed operation of step S2 shown in FIG. 26. In FIG. 27, a detailed operation of step S2 is described with the pixel GE1 shown in FIG. 3 being a pixel $GE_{ij}$, the pixel GE2 being a pixel $GE_{kl}$, the pixel GE3 being a $GE_{i+1,j}$, and the pixel GE4 being a $GE_{k+1,l}$.

Referring to FIG. 27, after step S1 shown in FIG. 26, the connection weight determining circuit 2 sequentially receives a plurality of RGB values $RGB_{ij}$ (1≦i≦n, 1≦j≦n) of a plurality of pixels $GE_{ij}$ (1≦i≦n, 1≦j≦n) from the pixel-value detecting circuit 1. The connection weight determining circuit 2 then sets i=1, j=1, k=1, and l=1 (step S21).

The connection weight determining circuit 2 then selects, of the plurality of pixels $GE_{ij}$ (1≦i≦n, 1≦j≦n) of the input image, two adjacent pixels $GE_{ij}$ and $GE_{kl}$ ((1≦k≦n, 1≦l≦n) sequentially input from the pixel-value detecting circuit 1 (step S22).

Thereafter, the connection weight determining circuit 2 uses the HS converting circuit 25 to convert the RGB values $RGB_{ij}$ of the pixel $GE_{ij}$ into a hue $H_{ij}$ and a saturation $S_{ij}$ (step S23) by using the above described method and to convert the RGB values $RGB_{kl}$ of the pixel $GE_{kl}$ into a hue $H_{kl}$ and a saturation $S_{kl}$ by using the above-described method (step S24).

The connection weight determining circuit 2 then determines whether or not the RGB values of four pairs of adjacent pixels $GE_{ij}$ and $GE_{kl}$, $GE_{i+1,j}$ and $GE_{kl}$, $GE_{ij}$ and $GE_{k+1,l}$, and $GE_{i+1,j}$ and $GE_{k+1,l}$ are converted into hues and saturations (step S25).

When it is determined in step S25 that the RGB values of the four pairs of adjacent pixels $GE_{ij}$ and $GE_{kl}$, $GE_{i+1,j}$ and $GE_{kl}$, $GE_{ij}$ and $GE_{k+1,1}$, and $GE_{i+1,j}$ and $GE_{k+1,l}$ are not converted into hues and saturations, one or both of i and k are varied by "1" (step S26). Thereafter, the series of operations returns to step S22, and steps S22 to S26 are repeatedly executed until it is determined in step S25 that the RGB values of the four pairs of adjacent pixels $GE_{ij}$ and $GE_{kl}$, $GE_{i+1,j}$ and $GE_{kl}$, $GE_{ij}$ and $GE_{k+1,l}$, and $GE_{i+1,j}$ and $GE_{k+1,l}$ are converted into hues and saturations.

Then, when it is determined in step S25 that the RGB values of the four pairs of adjacent pixels $GE_{ij}$ and $GE_{kl}$, $GE_{i+1,j}$ and $GE_{kl}$, $GE_{ij}$ and $GE_{k+1,l}$, and $GE_{i+1,j}$ and $GE_{k+1,l}$ are converted into hues and saturations, the four weight calculating units 32 to 35 in the connection weight determining circuit 2 determine connection weights between the adjacent pixels in parallel (steps S27 to S30).

In this case, the weight calculating unit 32 determines a connection weight $W_{k,l;i+1,j}$ between the pixels $GE_{kl}$ and $GE_{i+1,j}$, the weight calculating unit 33 determines a connection weight $W_{ij;\,k+1,l}$ between the pixels $GE_{ij}$ and $GE_{k+1,l}$, the weight calculating unit 34 determines a connection weight $W_{ij;kl}$ between the pixels $GE_{ij}$ and $GE_{kl}$, and the weight calculating unit 35 determines a connection weight $W_{i+1,j;k+1,l}$ between the pixels $GE_{i+1,j}$ and $GE_{k+1,l}$.

After steps S27 to S30, the connection weight determining circuit 2 determines whether or not i=n and j=n are satisfied (step S31). When i=n and j=n are not satisfied, one or both of i and j are varied by "1" (step S32) and k=1 and l=1 are set (step S33).

Thereafter, the series of operations returns to step S22, and steps S22 to S33 are repeatedly executed until it is determined in step S31 that i=n and j=n are satisfied.

Then, when it is determined in step S31 that i=n and j=n are satisfied, the series of operations proceeds to step S3 in FIG. 26.

Figure 28:
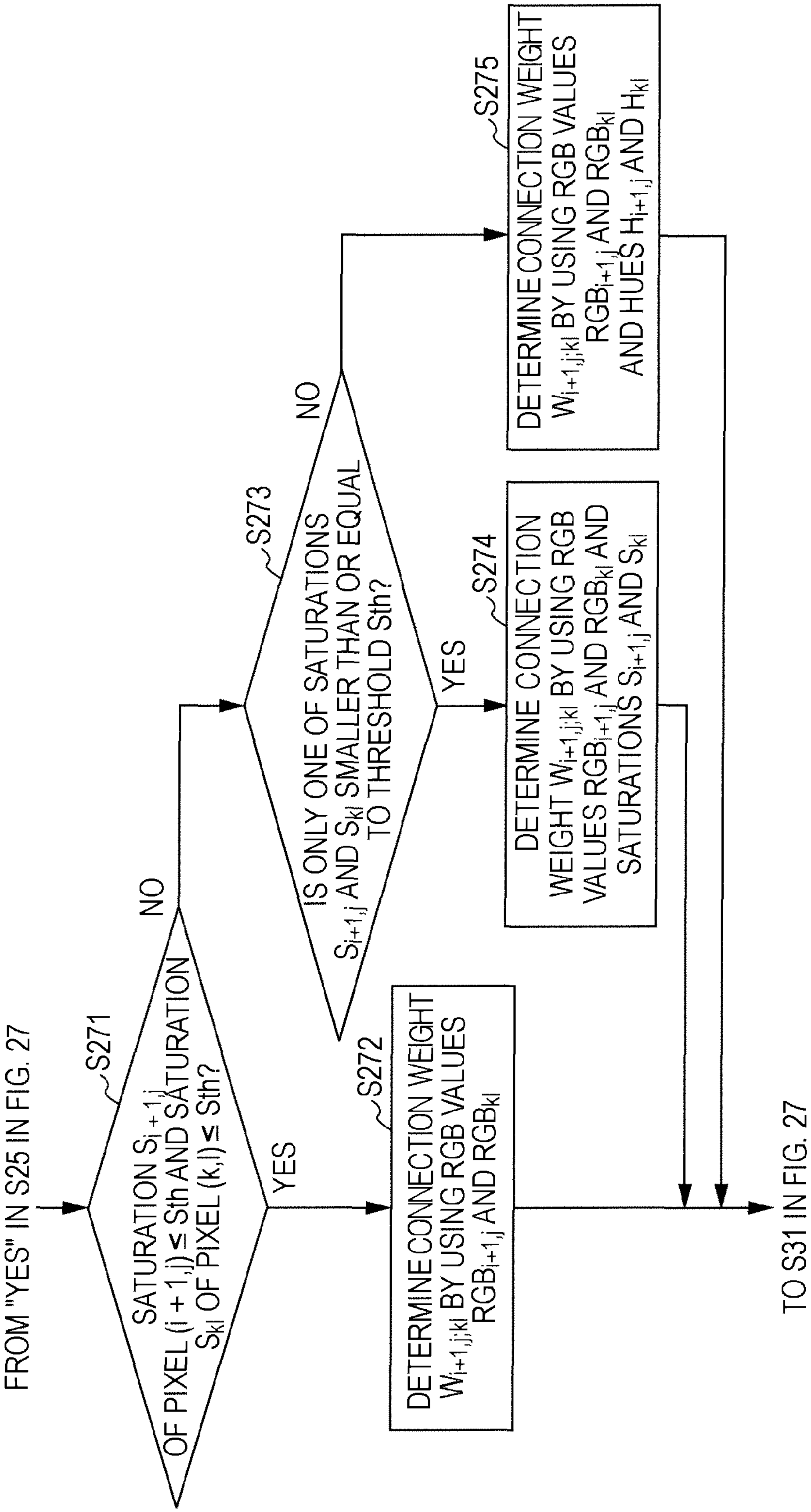
FIG. 28 is a flowchart for describing a detailed operation of step S27 shown in FIG. 27.

FIG. 28 is a flowchart for describing a detailed operation of step S27 shown in FIG. 27. Referring to FIG. 28, after "YES" in step S25 in FIG. 27, the connection weight computing circuit 320 in the weight calculating unit 32 determines a connection weight $W_{i+1,j;kl}$_RGB between the pixels $GE_{kl}$ and $GE_{i+1,j}$ by using the above-described method, on the basis of the RGB value $RGB_{kl}$ received from the FIFO circuit 23 and the RGB value $RGB_{i+1,j}$ received from the D latch circuit 22. The connection weight computing circuit 320 outputs the determined connection weight $W_{i+1,j;kl}$_RGB to the connection weight correcting circuits 350 and 360 and the selector 380.

The hue-difference calculating circuit 330 also receives the hue bin number$_A$ of the pixel $GE_{kl}$ from the FIFO circuit 28 and receives the hue bin number$_B$ of the pixel $GE_{i+1,j}$ from the D latch circuit 27. The hue-difference calculating circuit 330 then refers to the hue-bin-number assignment diagram shown in FIG. 14 to extract a hue $H_{kl}$ corresponding to the hue bin number$_A$ and a hue $H_{i+1,j}$ corresponding to the hue bin number$_B$.

Thus, the hue-difference calculating circuit 330 computes $|H_{kl}-H_{i+1,j}|$ which is a hue difference between the hue $H_{kl}$ and the hue $H_{i+1,j}$ and outputs the computed hue difference $|H_{kl}-H_{i+1,j}|$ to the connection weight correcting circuit 350.

The connection weight correcting circuit 350 receives the hue difference $|H_{kl}-H_{i+1,j}|$ from the hue-difference calculating circuit 330 and receives the connection weight $W_{i+1,j;kl_}$RGB from the connection weight computing circuit 320. The connection weight correcting circuit 350 then refers to Table 3 to extract a connection weight $W_{i+1,j;kl_}$H by using the above-described method, on the basis of the connection weight $W_{i+1,j;kl_}$RGB and the hue difference $|H_{kl}-H_{i+1,j}$. The connection weight correcting circuit 350 outputs the extracted connection weight $W_{i+1,j;kl_}$H to the selector 380.

In addition, the saturation-difference calculating circuit 340 receives the S bin number $_A$ of the pixel $GE_{kl}$ from the FIFO circuit 28 and receives the S bin number $_B$ of the pixel $GE_{i+1,j}$ from the D latch circuit 27.

The saturation-difference calculating circuit 340 then refers to the S-bin-number assignment diagram shown in FIG. 16 to extract a saturation $S_{kl}$ corresponding to the S bin number $_A$ and extract a saturation $S_{i+1,j}$ corresponding to the S bin number $_B$.

Thus, the saturation-difference calculating circuit 340 computes $|S_{kl}-S_{i+1,j}|$ which is a saturation difference between the saturation $S_{kl}$ and the saturation $S_{i+1,j}$, and outputs the computed saturation difference $|S_{kl}-S_{i+1,j}|$ to the connection weight correcting circuit 360.

The connection weight correcting circuit 360 receives the saturation difference $|S_{kl}-S_{i+1,j}|$ from the saturation-difference calculating circuit 340 and receives the connection weight $W_{i+1,j;kl_}$RGB from the connection weight computing circuit 320. The connection weight correcting circuit 360 then refers to Table 2 to extract a connection weight $W_{i+1,j;kl_}$S by using the above-described method, on the basis of the connection weight $W_{i+1,j;kl_}$RGB and the saturation difference $S_{kl}-S_{i+1,j}|$. The connection weight correcting circuit 360 outputs the extracted connection weight $W_{i+1,j;kl_}$S to the selector 380.

On the other hand, the selector-signal generating circuit 370 in the weight calculating unit 32 receives the S bin number $_A$ of the pixel $GE_{kl}$ from the FIFO circuit 28 and the S bin number $_B$ of the pixel $GE_{i+1,j}$ from the D latch circuit 27.

The selector-signal generating circuit 370 then refers to the S-bin-number assignment diagram shown in FIG. 16 to extract a saturation $S_{kl}$ corresponding to the S bin number $_A$ and extract a saturation $S_{i+1,j}$ corresponding to the S bin number $_B$.

Thus, the selector-signal generating circuit 370 determines whether or not the saturation $S_{i+1,j}$ is smaller than or equal to the threshold Sth (=0.2) and the saturation $S_{kl}$ is smaller than or equal to the threshold Sth (=0.2) (step S271).

When it is determined in step S271 that the saturation $S_{i+1,j}$ is smaller than or equal to the threshold Sth (=0.2) and the saturation $S_{kl}$ is smaller than or equal to the threshold Sth (=0.2), the selector-signal generating circuit 370 generates the selector signal SEL_RGB and outputs the generated selector signal SEL_RGB to the selector 380.

The selector 380 receives the connection weight $W_{i+1,j;kl_}$RGB from the connection weight computing circuit 320, receives the connection weight $W_{i+1,j;kl_}$H from the connection weight correcting circuit 350, and receives the connection weight $W_{i+1,j;kl_}$S from the connection weight correcting circuit 360. Then, upon receiving the selector signal SEL_RGB from the selector-signal generating circuit 370, the selector 380 selects the connection weight $W_{i+1,j;kl_}$RGB from the three connection weights $W_{i+1,j;kl_}$RGB, $W_{i+1,j;kl_}$H, and $W_{i+1,j;kl_}$S in accordance with the selector signal SEL_RGB, and determines the selected connection weight $W_{i+1,j;kl_}$RGB as a connection weight $W_{i+1,j;kl}$. That is, the weight calculating unit 32 determines the connection weight $W_{i+1,j;kl}$ by using the RGB values $RGB_{i+1,j}$ and $RGB_{kl}$ (step S272). The weight calculating unit 32 then outputs the determined connection weight $W_{i+1,j;kl}$ to the image segmenting circuit 3.

On the other hand, when it is determined in step S271 that the saturation $S_{i+1,j}$ is smaller than or equal to the threshold Sth (=0.2) and the saturation $S_{kl}$ is not smaller than or equal to the threshold Sth (=0.2), the selector-signal generating circuit 370 further determines whether or not only one of the saturations $S_{i+1,j}$ and $S_{kl}$ is smaller than or equal to the threshold Sth (=0.2) (step S273).

Then, when it is determined in step S273 that only one of the saturations $S_{i+1,j}$ and $S_{kl}$ is smaller than or equal to the threshold Sth (=0.2), the selector-signal generating circuit 370 generates the selector signal SEL_S and outputs the generated selector signal SEL_S to the selector 380.

Upon receiving the selector signal SEL_S from the selector-signal generating circuit 370, the selector 380 selects the connection weight $W_{i+1,j;kl_}$S from the three connection weights $W_{i+1,j;kl_}$RGB, $W_{i+1,j;kl_H,\ and\ W i+1,j;kl_}$S in accordance with the selector signal SEL_S, and determines the selected connection weight $W_{i+1,j;kl_}$S as a connection weight $W_{i+1,j;kl}$. That is, the weight calculating unit 32 determines the connection weight $W_{i+1,j;kl}$ by using the RGB values $RGB_{i+1,j}$ and $RGB_{kl}$ and the saturations $S_{i+1,j}$ and $S_{kl}$ (step S274). The weight calculating unit 32 then outputs the determined connection weight $W_{i+1,j;kl}$ to the image segmenting circuit 3.

On the other hand, when it is determined in step S273 that only one of the saturations $S_{i+1,j}$ and $S_{kl}$ is not smaller than or equal to the threshold Sth (=0.2), the selector-signal generating circuit 370 generates the selector signal SEL_H and outputs the generated selector signal SEL_H to the selector 380.

Upon receiving the selector signal SEL_H from the selector-signal generating circuit 370, the selector 380 selects the connection weight $W_{i+1,j;kl_}$H from the three connection weights $W_{i+1,j;kl_}$RGB, $W_{i+1,j;kl_H,\ and\ W i+1,j;kl_}$S in accordance with the selector signal SEL_H, and determines the selected connection weight $W_{i+1,j;kl_}$H as a connection weight $W_{i+1,j;kl}$. That is, the weight calculating unit 32 determines the connection weight $W_{i+1,j;kl}$ by using the RGB values $RGB_{i+1,j}$ and $RGB_{kl}$ and the hues $H_{i+1,j}$ and $H_{kl}$ (step S275). The weight calculating unit 32 then outputs the determined connection weight $W_{i+1,j;kl}$ to the image segmenting circuit 3.

Then, after any of steps S272, S274, and S275, the series of operations proceeds to step S31 in FIG. 27.

Step S274 includes a step of determining the connection weight $W_{i+1,j;kl_}$RGB by using only the RGB values $RGB_{i+1,j}$ and $RGB_{kl}$ and a step of reducing the determined connection weight $W_{i+1,j;kl_}$RGB in accordance with the saturation difference $|S_{i+1,j}-S_{kl}|$ between the saturations $S_{i+1,j}$ and $S_{kl}$.

Also, step S275 includes a step of determining the connection weight $W_{i+1,j;kl_}$RGB by using only the RGB values $RGB_{i+1,j}$ and $RGB_{kl}$ and a step of increasing the determined connection weight $W_{i+1,j;kl_}$RGB in accordance with the hue difference $|H_{i+1,j}-H_{kl}|$ between the hues $H_{i+1,j}$ and $H_{kl}$.

In addition, detailed operations of respective steps S28 to S30 shown in FIG. 27 are executed in steps S271 to S275 shown in FIG. 28.

Figure 29:
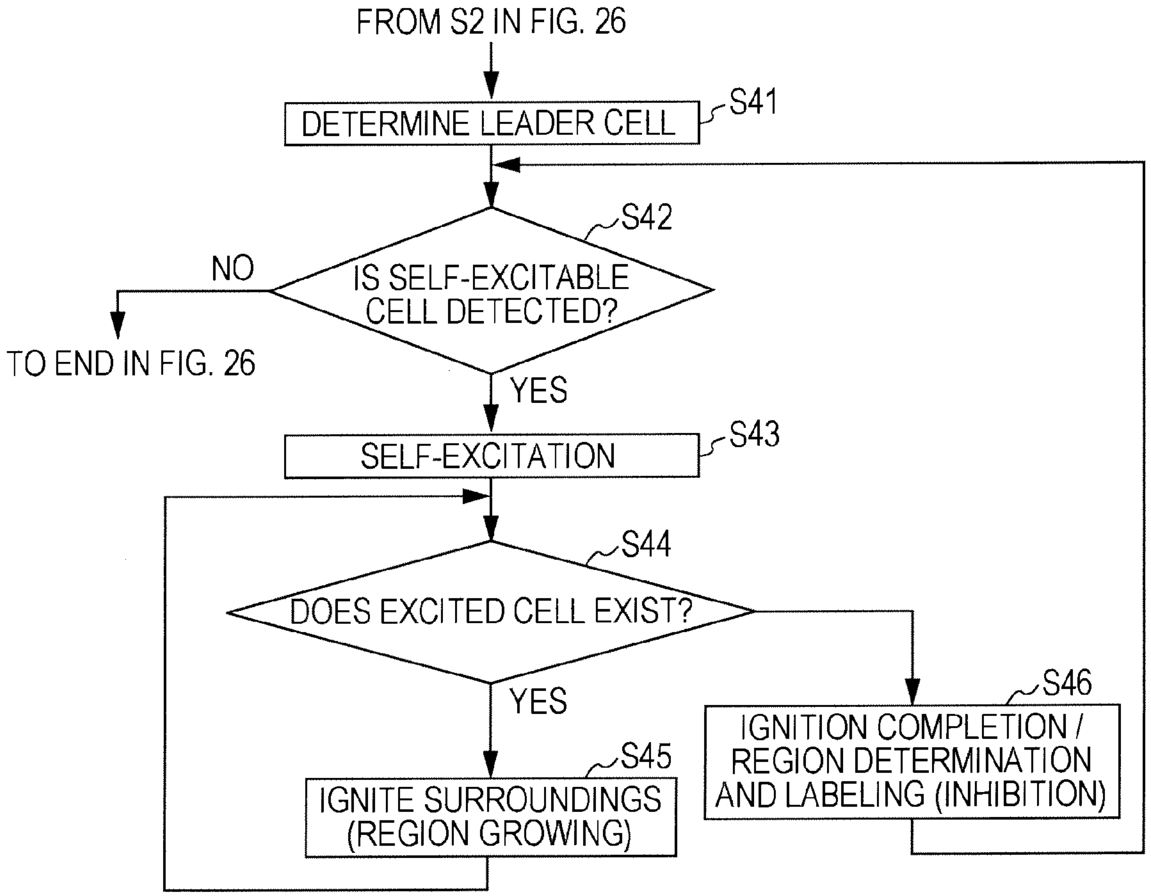
FIG. 29 is a flowchart for describing a detailed operation of step S3 shown in FIG. 26.

FIG. 29 is a flowchart for describing a detailed operation of step S3 shown in FIG. 26. Referring to FIG. 29, after step S2 shown in FIG. 26, the image segmenting circuit 3 receives, from the connection weight determining circuit 2, connection weights between pixels of a plurality of pixels constituting one frame, and determines a leader cell by using the above-described method (step S41).

The image segmenting circuit 3 then determines whether or not a self-excitable cell is detected (step S42). When it is determined that a self-excitable cell is detected, self-excitation is performed by the above-described method (step S43).

Thereafter, the image segmenting circuit 3 determines whether or not an excited cell exists (step S44). When an excited cell exists, the image segmenting circuit 3 ignites the surroundings (region growing) (step S45) by using the above-described method. The series of operations then returns to step S44, and steps S44 and S45 are repeatedly executed until no more excited cell exists in step S44.

When it is determined in step S44 that no excited cell exists, the image segmenting circuit 3 performs ignition completion/region determination by using the above-described method and also performs labeling (inhibition) (step S46). Thereafter, the series of operations returns to step S42, and steps S42 to S46 are repeatedly executed until it is determined that no self-excitable cell is detected in step S42.

Then, when it is determined in step S42 that no self-excitable cell is detected, the series of operations proceeds to "END" in FIG. 26.

The image segmentation apparatus 10 repeatedly executes the flowcharts shown in FIG. 26 (FIGS. 27 to 29) to segment each frame into images of subjects.

As described above, in the present invention, when both of two saturations of two adjacent pixels are smaller than or equal to the threshold Sth, the connection weight between the two pixels is determined using only the RGB values of the two pixels (refer to step S272). When only one of the two saturations is smaller than or equal to the threshold Sth, the connection weight between the two pixels is determined using the RGB values and the saturations of the two pixels (refer to step S274). When both of the two saturations of two pixels are greater than the threshold Sth, the connection weight is determined using two RGB values and hues (refer to step S275).

The connection weight determined in step S274 is smaller than the connection weight determined in step S272 and the connection weight determined in step S275 is greater than or equal to the connection weight determined in step S272.

As described above, when at least one of the two saturations of two pixels is greater than the threshold Sth, the connection weight between the two pixels is determined using the saturations or the hues.

It is, therefore, possible to accurately determine the connection weight between pixels in a color image having a low contrast or in a color image affected by light reflection.

Also, when two pixels belong to an achromatic region and a chromatic region, the connection weight is determined to be smaller than the connection weight determined using only RGB values (refer to step S274). Thus, region growing during image segmentation is suppressed, and when both of two pixels belong to a chromatic region, the connection weight is determined to be greater than or equal to the connection weight determined using only RGB values (refer to step S275). Thus, region growing during image segmentation is promoted.

It is, therefore, possible to accurately segment a color image having a low contrast or a color image affected by light reflection.

Figure 30:
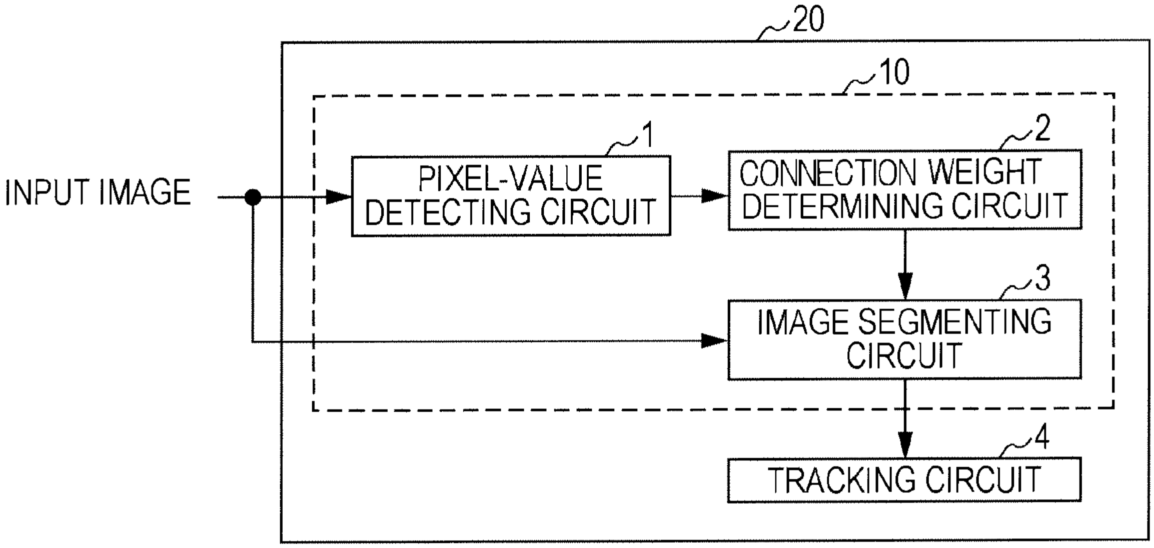
FIG. 30 is a configuration diagram of an object tracking apparatus using the image segmentation apparatus according to the present invention.

FIG. 30 is a configuration diagram of an object tracking apparatus using the image segmentation apparatus 10 according to the present invention. Referring to FIG. 30, an object tracking apparatus 20 is an apparatus in which a tracking circuit 4 is added to the image segmentation apparatus 10.

The tracking circuit 4 sequentially receives segmented images DVG1 and DVG2 from the image segmenting circuit 3 and extracts object features CH1 and CH2 expressed by the received segmented images DVG1 and DVG2. Then, by using the extracted object features CH1 and CH2, the tracking circuit 4 performs object pattern matching between the segmented images DVG1 and DVG2 to detect motion vectors and also to determine an estimated position of an object.

The object features CH1 and CH2 are, for example, the height, color, and area of the object. The pattern matching is performed by computing Manhattan distances or the like and determining a minimum Manhattan distance or the like.

As described above, since the image segmentation apparatus 10 can accurately segment an image, the tracking circuit 4 can accurately track an object by using the accurately segmented images.

Although the conversion from the RGB value to a saturation (S) or a hue (H) has been described above as being performed using an adder and a shifter, the present invention is not limited thereto. When there is no special restriction, for example, when the circuit area does not become a problem, a circuit using a divider may be used to convert the RGB value into a saturation (S) or a hue (H).

Although the threshold Sth has been described above as being set to 0.2, the present invention is not limited thereto. The threshold Sth may have a value other than 0.2, and, in general, is empirically determined based on the color tone of each object in an input image to be subjected to image segmentation.

In addition, although the image segmentation has been described above as being performed using a region-growing image segmentation method, the present invention is not limited thereto. The image segmentation may be performed using a method described in any of the document "B. Jaehne, 'Digital Image Processing 5th revised and extended edition,' Springer-Verlag, pp. 427-440, 2001," the document "J. C. Russ, 'The Image Processing Handbook,' CRC PRESS, pp. 371-429, 1999.36, " the document "T. Braeunl, S. Feyrer, W. Rapf, and M. Reinhardt, 'Parallel Image Processing,' Springer-Verlag, 2000," and the document "W. Y. Ma, and B. S. Manjunath, 'Edgeflow: a technique for boundary detection and segmentation,' IEEE Transactions on Image Processing, Vol. 9(8), pp. 1375-1388, 2000."

In the present invention, a connection weight determined using only RGB values constitutes a "first connection weight", a connection weight determined using RGB values and saturations (S) constitutes a "second connection weight" that is smaller than the first connection weight, and a connection weight determined using RGB values and hues (H) constitutes a "third connection weight" that is greater than or equal to the first connection weight.

Also, the pixel-value difference 01xx_xxxx shown in Table 3 constitutes "a first value" and the pixel-value difference 0001_xxxx constitutes a "second value" that is greater than the first value.

It should be construed that the embodiment disclosed herein is illustrative in any point and is not limiting. The scope of the present invention is shown by the claims, rather than the above-described embodiment, and is intended to include all modifications within the scope of the claims and their equivalent meanings.

INDUSTRIAL APPLICABILITY

The present invention is applied to an image segmentation apparatus that is capable of accurately segmenting an input image containing a color image into images of subjects. The present invention is also applied to an image segmentation method that is capable of accurately segmenting an input image containing a color image into images of subjects.

The invention claimed is:

1. An image segmentation apparatus comprising:

a connection weight determining circuit executing, with respect to between pixels of one frame, connection weight determination processing in which when both of two pixels have achromatic color, a first connection weight that is a connection weight between the two pixels is determined by using RGB values of the two pixels, when one of the two pixels has achromatic color, a second connection weight that is smaller than the first connection weight is determined as a connection weight between the two pixels, and when both of the two pixels have chromatic color, a third connection weight that is greater than or equal to the first connection weight is determined as a connection weight between the two pixels; and an image segmenting circuit segmenting the one frame into images of subjects on a basis of the first to third connection weights determined by the connection weight determining circuit.

2. The image segmentation apparatus according to claim 1, wherein the connection weight determining circuit computes first and second saturations of the two pixels on a basis of the RGB values of the two pixels, compares the computed first and second saturations with a threshold indicating a boundary between achromatic color and chromatic color to determine which of the achromatic color and the chromatic color the two pixels have, and determines any of the first to third connection weights as a connection weight between the two pixels on a basis of a result of the determination.

3. The image segmentation apparatus according to claim 2, wherein, by using an adder and a shifter, the connection weight determining circuit computes the first and second saturations of the two pixels on the basis of the RGB values of the two pixels.

4. The image segmentation apparatus according to claim 2, wherein, when both of the computed first and second saturations are smaller than or equal to the threshold, the connection weight determining circuit determines that both of the two pixels have the achromatic color; when one of the first and second saturations is smaller than or equal to the threshold, the connection weight determining circuit determines that one of the two pixels has the achromatic color and the other of the two pixels has the chromatic color; and when both of the first and second saturations are greater than the threshold, the connection weight determining circuit determines that both of the two pixels have the chromatic color.

5. The image segmentation apparatus according to claim 3, wherein, upon determining that both of the two pixels have the achromatic color, the connection weight determining circuit uses only the RGB values of the two pixels to determine the first connection weight; upon determining that one of the two pixels has the achromatic color and the other of the two pixels has the chromatic color, the connection weight determining circuit uses the RGB values and the saturations of the two pixels to determine the second connection weight; and upon determining that both of the two pixels have the chromatic color, the connection weight determining circuit uses the RGB values and hues of the two pixels to determine the third connection weight.

6. The image segmentation apparatus according to claim 5, wherein the connection weight determining circuit computes the first connection weight by using only the RGB values; upon determining that one of the two pixels has the achromatic color and the other of the two pixels has the chromatic color, the connection weight determining circuit determines the second connection weight by reducing the computed first connection weight in accordance with a saturation difference that is a difference between the saturations of the two pixels; and upon determining that both of the two pixels have the chromatic color, the connection weight determining circuit determines the third connection weight by increasing the first connection weight in accordance with a hue difference that is a difference between the hues of the two pixels.

7. The image segmentation apparatus according to claim 6, wherein, upon determining that both of the two pixels have the chromatic color, the connection weight determining circuit computes first and second hues of the two pixels on the basis of the RGB values of the two pixels, computes a difference between the computed first and second hues as the hue difference, and determines the third connection weight by using the computed hue difference.

8. The image segmentation apparatus according to claim 7, wherein, by using an adder and a shifter, the connection weight determining circuit computes the first and second hues of the two pixels on a basis of the RGB values of the two pixels.

9. The image segmentation apparatus according to claim 6, wherein, upon determining that one of the two pixels has the achromatic color and the other of the two pixels has the chromatic color, the connection weight determining circuit determines the second connection weight by making a reduction range from the first connection weight to be relatively small, when the saturation difference is relatively small, and determines the second connection weight by making the reduction range from the first connection weight to be relatively large when the saturation difference is relatively large.

10. The image segmentation apparatus according to claim 9, wherein the connection weight determining circuit holds a table of association between a difference between two luminances calculated using the RGB values of the two pixels, the saturation difference and a corrected connection weight reduced from the first connection weight in accordance with the saturation difference; and upon computing the saturation difference between the two pixels, the connection weight determining circuit extracts, from the association table, the corrected connection weight corresponding to the computed saturation difference and determines the extracted corrected connection weight as the second connection weight.

11. The image segmentation apparatus according to claim 6, wherein, upon determining that both of the two pixels have the chromatic color, the connection weight determining circuit sets a value that is greater than or equal to the first connection weight in accordance with the hue difference to determine the third connection weight when a difference between two luminances calculated using the RGB values of the two pixels shows that there is an influence of light reflection.

12. The image segmentation apparatus according to claim 11, wherein the connection weight determining circuit determines the first connection weight as the third connection weight when the difference between two luminances calculated using the RGB values of the two pixels shows that there is no influence of light reflection.

13. The image segmentation apparatus according to claim 11, wherein the connection weight determining circuit holds a table of association between a difference between two luminances calculated using the RGB values of the two pixels, the hue difference and a corrected connection weight increased from the first connection weight in accordance with the hue difference; and when the difference between two luminances calculated using the RGB values of the two pixels shows that there is an influence of light reflection and upon computing the hue difference between the two pixels, the connection weight determining circuit extracts, from the association table, the corrected connection weight corresponding to the computed hue difference and determines the extracted corrected connection weight as the third connection weight.

14. An image segmentation method comprising:

a first step of receiving RGB values of two pixels;

a second step of computing first and second hues of the two pixels on a basis of the received RGB values of the two pixels;

a third step of computing first and second saturations of the two pixels on a basis of the received RGB values of the two pixels;

a fourth step of determining whether or not both of the first and second saturations are smaller than or equal to a threshold indicating a boundary between achromatic color and chromatic color;

a fifth step of determining a first connection weight, which is a connection weight between the two pixels, by using only the RGB values of the two pixels when it is determined in the fourth step that both of the first and second saturations are smaller than or equal to the threshold;

a sixth step of determining, as a connection weight between the two pixels, a second connection weight that is smaller than the first connection weight, by using the RGB values of the two pixels and the first and second saturations when it is determined in the fourth step that one of the first and second saturations is smaller than or equal to the threshold;

a seventh step of determining, as a connection weight between the two pixels, a third connection weight that is greater than or equal to the first connection weight, by using the RGB values of the two pixels and the first and second hues when it is determined in the fourth step that both of the first and second saturations are greater than the threshold;

an eighth step of executing the first step to the seventh step with respect to between all pixels contained in one frame; and a ninth step of segmenting the one frame into images of subjects on a basis of the first to third connection weights determined by the execution of the eighth step.

15. The image segmentation method according to claim 14, wherein the sixth step includes:

a first sub-step of computing the first connection weight by using only the RGB values; and a second sub-step of determining the second connection weight by reducing the computed first connection weight in accordance with a saturation difference that is a difference between the saturations of the two pixels; and the seven step includes:

a third sub-step of computing the first connection weight by using only the RGB values;

a fourth sub-step of determining, when the two pixels show that there is an influence of light reflection, the third connection weight by increasing the computed first connection weight in accordance with a hue difference that is a difference between the hues of the two pixels; and a fifth sub-step of determining the computed first connection weight as the third connection weight, when the two pixels show that there is no influence of light reflection.

16. The image segmentation method according to claim 15, wherein, in the second sub-step, when the saturation difference is relatively small, the second connection weight is determined by making a reduction range from the first connection weight to be relatively small, and when the saturation difference is relatively large, the second connection weight is determined by making the reduction range from the first connection weight to be relatively large.

17. The image segmentation method according to claim 15, wherein pixels affected by the light reflection are pixels in which a difference between two luminances calculated using the RGB values of the two pixels exists between a first value and a second value that is greater than the first value.

* * * * *

UNITED STATES PATENT AND TRADEMARK OFFICE

CERTIFICATE OF CORRECTION

PATENT NO. : 7,853,075 B2
APPLICATION NO. : 12/601595
DATED : December 14, 2010
INVENTOR(S) : Mattausch et al.

It is certified that error appears in the above-identified patent and that said Letters Patent is hereby corrected as shown below:

On the Title Page, in Field (56), under “OTHER PUBLICATIONS”, in Column 2, Line 1, delete “Mergins”,” and insert -- Margins”, --, therefor.

On Page 2, in Field (56), under “OTHER PUBLICATIONS”, in Column 1, Line 1, delete “anisotropoc” and insert -- anisotropic --, therefor.

On Page 2, in Field (56), under “OTHER PUBLICATIONS”, in Column 1, Line 4, delete “Unupervised” and insert -- Unsupervised --, therefor.

In Column 10, Line 28, delete “an” and insert -- to --, therefor.

In Column 24, Line 48, delete “ $|I_A(G)-|_B(G)|$ ” and insert -- $|I_A(G)-I_B(G)|$ --, therefor.

In Column 25, Line 48, delete “ $|_{ij}-I_{kl}|$ ” and insert -- $|I_{ij}-I_{kl}|$ --, therefor.

In Column 26, Line 55, delete “ $|I_1-I_{kl}|$ ” and insert -- $|I_{ij}-I_{kl}|$ --, therefor.

In Column 27, Line 24, delete “$W_{A,B}$_S” and insert -- $W_{A,B}$_H --, therefor.

In Column 28, Line 61, delete “ $SUM(_{k,\ l)\in Nij^{\wedge}\times kl=1}$ ” and insert -- $SUM_{(k,l)\in Nij\wedge\times kl=1}$ --, therefor.

In Column 29, Line 45, delete “1≦l≦n” and insert -- 1≦l≦n), --, therefor.

Signed and Sealed this
Twenty-fourth Day of April, 2012

David J. Kappos
*Director of the United States Patent and Trademark Office*

In Column 30, Line 11, delete "$GE_{k+1,1}$," and insert -- $GE_{k+1,l}$, --, therefor.

In Column 31, Line 10, delete "$|H_{kl}-H_{i+1,j}$." and insert -- $|H_{kl}-H_{i+1,j}|$. --, therefor.

In Column 31, Line 35, delete "$S_{kl}-S_{i+1,j}|$." and insert -- $|S_{kl}-S_{i+1,j}|$. --, therefor.

In Column 32, Line 22, delete "$W_{i+1,j;kl\_H}$, and $W^{i+1,j;kl\_S}$" and insert -- $W_{i+1,j;kl\_H}$, and $W_{i+1,j;kl\_S}$ --, therefor.

In Column 32, Line 38, delete "$W_{i+1,j;kl\_H}$, and $W^{i+1,j;kl\_S}$" and insert --" $W_{i+1,j;kl\_H}$, and $W_{i+1,j;kl\_S}$ --, therefor.